US008263017B2

(12) United States Patent
Stewart et al.

(10) Patent No.: US 8,263,017 B2
(45) Date of Patent: Sep. 11, 2012

(54) TEMPERATURE-SWITCHING MATERIALS HAVING IMPROVED STRENGTH AND THERMAL PROPERTIES

(75) Inventors: Ray F. Stewart, Emerald Lake Hills, CA (US); Debra L. Dunson, Fremont, CA (US)

(73) Assignee: Bay Materials, LLC, Menlo Park, CA (US)

( * ) Notice: Subject to any disclaimer, the term of this patent is extended or adjusted under 35 U.S.C. 154(b) by 899 days.

(21) Appl. No.: 12/243,722

(22) Filed: Oct. 1, 2008

(65) Prior Publication Data
US 2009/0092519 A1     Apr. 9, 2009

Related U.S. Application Data

(60) Provisional application No. 60/997,347, filed on Oct. 1, 2007, provisional application No. 61/063,285, filed on Feb. 1, 2008.

(51) Int. Cl.
*G01N 31/22* (2006.01)

(52) U.S. Cl. .............. 422/400; 422/51; 436/2; 436/147; 426/88; 116/218; 374/155

(58) Field of Classification Search .................... 422/51, 422/400; 436/2, 147; 426/88; 116/218; 374/155

See application file for complete search history.

(56) References Cited

U.S. PATENT DOCUMENTS

| 4,029,150 | A | 6/1977 | Goodsell, Jr. |
| 4,748,931 | A | 6/1988 | Volk |
| 5,323,730 | A | 6/1994 | Ou-Yang |
| 5,537,950 | A | 7/1996 | Ou-Yang |
| 5,799,606 | A | 9/1998 | Volk et al. |
| 5,988,102 | A | 11/1999 | Volk et al. |
| 7,204,199 | B2 | 4/2007 | Ribi et al. |
| 2005/0211153 | A1 | 9/2005 | Ribi et al. |
| 2008/0286481 | A1* | 11/2008 | Moens et al. ................. 427/461 |

FOREIGN PATENT DOCUMENTS
WO     WO 95/06862     3/1995

OTHER PUBLICATIONS
International Search Report and Written Opinion from PCT/US2008/078471 mailed May 10, 2010 (11 pages).

* cited by examiner

*Primary Examiner* — Lyle Alexander
(74) *Attorney, Agent, or Firm* — Judy Mohr; Stephen Todd; Jacqueline F. Mahoney

(57) ABSTRACT

The subject matter described herein relates to thermoresponsive switching materials that undergo a thermal transition over a narrow temperature range and to devices, such as actuators, indicators, and sensors, prepared from such compositions.

22 Claims, 9 Drawing Sheets

TEMPERATURE-SWITCHING MATERIALS HAVING IMPROVED STRENGTH AND THERMAL PROPERTIES

PRIORITY

This application claim priority to U.S. Provisional Application Ser. Nos. 60/997,347, filed on Oct. 1, 2007, and 61/063,285, filed on Feb. 1, 2008, which are hereby incorporated by reference in their entirety.

TECHNICAL FIELD

The subject matter described herein relates to temperature switching materials that undergo a thermal transition over a narrow temperature range and to devices, such as actuators, indicators, and sensors, prepared from such compositions.

BACKGROUND

A variety of devices in a wide range of industries include one or more components prepared from a material that undergoes a phase change at a temperature of interest. The phase change alters the physical properties of the component part, which typically alters the way other components in a device are positioned or interact. For example, in response to a phase change in a structural component of a device, related components may expand or contract, inducing a reaction, such as movement of an adjacent component part.

Common examples of such devices are mechanical actuators in which a material, typically a metal alloy, a polymer, or a wax, in the actuator expands or contracts to effect movement of parts in the actuator (e.g., U.S. Pat. Nos. 5,025,627; 5,177,969). Temperature relief valves having a thermal trigger composed of a eutectic material are known (e.g., U.S. Pat. No. 5,495,865). Fire sprinklers and fire extinguishes having a component part that responds to temperature increases are known (e.g., U.S. Pat. Nos. 4,896,728; 4,006,780).

Temperature indicating devices for use in the medical industry and in the food industry are also known, in which a component in the temperature-indicating device is composed of a material that undergoes a phase change at a selected temperature (e.g., U.S. Pat. Nos. 4,289,088; 4,170,956; 5,537,950; 5,988,102; 6,403,131). In such devices, a spring loaded indicator is typically held in place by a small quantity of solid or semi-solid material that melts or deforms at a temperature of interest, thereby allowing the device to respond to a preselected temperature. Exemplary materials are a eutectic metal alloy or an organic compound.

These and similar devices require the use of materials that have sharp melting points, typically in the range of 50 to 100° C., where most foods are cooked and within the range of environment and physiological temperatures.

However, there are few eutectic metal alloys that have a melting temperature in this temperature range. In addition, eutectic metal alloys such as, e.g., lead/cadmium mixtures, have inherent toxicity and may not be suitable for use in the medical or food industries. Low melting eutectic alloys are also costly.

Similarly, there are few organic compounds that have melting points in the temperature range of interest, and of those that do have a suitable melting point often possess a physical or chemical property that renders the material toxic or otherwise undesirable for use in an actuator device.

A further problem with existing metallic and organic compounds is that it is not possible to vary the melting point, while at the same time maintaining abrupt melting behavior (i.e., a sharp melting curve). For example, if the composition of an eutectic alloy is changed slightly, the melting point will either not change, broaden unacceptably, or give multiple melting points. Likewise, if a pure organic compound having a given melting point is mixed with another compound, the melting point of the mixture will invariably be lower and occur over a broader range. Moreover, while melting is a thermodynamic property, the behavior of a mechanical device, such as a food temperature indicator or a fire sprinkler, is also determined by the mechanical properties of the materials used. Many organic compounds that have sharp melting points do not provide the mechanical properties for use in a thermo-mechanical device.

It would be desirable to have a series of organic materials for which the melting properties could be varied while maintaining a sharp melting profile, and which possess the necessary mechanical properties for use in a thermo-mechanical device. Ideal materials (i) have a melting point between about 50 and about 120° C.; (ii) are non toxic to humans; (iii) have a low vapor pressure at the temperatures at which they are used; (iv) are stable at elevated temperatures and humidity; (v) have minimal odor; (vi) have a rapid rate of crystallization; (vii) are low in cost; (viii) are readily produced in high purity; and (ix) demonstrate a sharp melting profile characterized by an abrupt change in viscosity with a temperature change.

BRIEF SUMMARY

The following aspects and embodiments thereof described and illustrated below are meant to be exemplary and illustrative, not limiting in scope.

In some aspects, a thermoresponsive switching material (TSM) composition is provided, comprising: (a) a low molecular weight organic compound (LMWOC) based material having a melting point of about 50-120° C., and (b) a strengthening agent having a molecular weight of from about 500 to about 5,000 Da as a minor component, wherein the composition has increased mechanical strength compared to the low molecular weight organic compound-based material and substantially the same melting point and melting point spread as the low molecular weight organic compound.

In some embodiments, the strengthening agent has a softening point or melting point at least about 10° C. above the melting temperature of the low molecular weight organic compound. In some embodiments, the strengthening agent has a softening point or melting point at least about 15° C. above the melting temperature of the low molecular weight organic compound-based material.

In some embodiments, the strengthening agent is present in an amount of 20% or less. In some embodiments, the strengthening agent is present in an amount of 10% or less.

In some embodiments, the composition has a mechanical strength below its melting temperature that is at least 10% greater than the mechanical strength of the low molecular weight organic compound-based material.

In some embodiments, the composition has a melting point spread of 10° C. or less. In some embodiments, the composition has a melting point spread of 7° C. or less.

In some embodiments, the organic compound is selected from the group consisting of n-alkyl carboxylic acids, n-alkyl benzamides, bis n-alkyl amides, and n-alkyl alcohols.

In some embodiments, the strengthening agent is selected from the group consisting of a rosin, a polymerized rosin, a rosin ester, an ethylene/acrylic acid copolymer, a non-polar hydrocarbon, a monoamide, a polyethylene wax, an aliphatic or cycloaliphatic resin, and a pentaerythritol ester. In some embodiments, the strengthening agent is a tackifier. In some embodiments, the strengthening agent is amorphous.

In some embodiments, the strengthening agent has a total crystallinity of less than 10 joules/gram. In some embodiments, the strengthening agent is crystalline. In some embodiments, the strengthening agent has a heat of fusion of less than about 10 J/g.

In a related aspect, a thermoresponsive switching material (TSM) composition is provided, having increased mechanical strength and a narrow melting temperature range comprising: from about 80% to about 99% of a first crystalline, non polymeric, low molecular weight organic compound (LM-WOC) based material having an melting point spread of about 10° C., and from about 1% to about 20% of a strengthening agent, wherein the thermoresponsive switching material has a mechanical strength below it's melting temperature that is at least 10% greater than the mechanical strength of the first crystalline, non polymeric, low molecular weight organic compound-based material.

In some embodiments, the TSM composition has a narrow melting temperature range of less than about 10° C.

In some embodiments, the strengthening agent is amorphous. In some embodiments, the strengthening agent has a total crystallinity of less than 10 joules/gram. In some embodiments, the strengthening agent is crystalline.

In some embodiments, the strengthening agent is monomeric. In some embodiments, the strengthening agent is polymeric. In some embodiments, the strengthening agent has a molecular weight of from about 500 to about 5,000 Da.

In some embodiments, the first crystalline, non polymeric, low molecular weight organic compound-based material is selected from the group consisting of a dialkyl amide, a n-alkyl benzamide an aliphatic or aromatic carboxylic acid, an aliphatic alcohol, an alkane, an ester, and a ketone.

In some embodiments of the TSM, the strengthening agent is an organic compound having a melting or softening point at least 10° C. greater that the melting of softening point of the first crystalline, non polymeric, low molecular weight organic compound-based material; and has as a melting range of less than about 15° C.

In another related aspect, a thermoresponsive switching material composition is provided, comprising: (a) at least two homologous fatty acids, each having a mechanical strength, and (b) a strengthening agent having a molecular weight of from about 500 to about 5,000 Da and present in an amount less than about 20%, wherein the composition has at least 10% greater mechanical strength than either of the fatty acids.

In some embodiments, the mixture of two or more fatty acids includes at least one fatty acid selected from the group consisting of a C14 fatty acids, a C16 fatty acids, and a C18 fatty acid. In some embodiments, the mixture further comprises a C22 fatty acid. In some embodiments, the lowest molecular weight fatty acid is at least 50% of the mixture of fatty acids.

In another aspect, a device comprising any of the TSM compositions described above is provided. In some embodiments, the device is a thermoresponsive device. In some embodiments, a temperature sensor comprising a composition as described above is provided. In some embodiments, the sensor is disposable following a single use. In some embodiments, the sensor is reusable.

In some embodiments, the device is a thermo-mechanical actuator comprised of a fixed member comprised of a composition as described above, and at least one moveable member coupled to the fixed member, wherein the moveable member is induced to move when the fixed member is exposed to a temperature change.

In some embodiments, the device is a thermo-mechanical device having at least one lumen and said material forms a temporary plug in lumen which plug is displaced when heated to a temperature.

In addition to the exemplary aspects and embodiments described above, further aspects and embodiments will become apparent by reference to the drawings and by study of the following descriptions.

DETAILED DESCRIPTION

I. Definitions

Figure 1:
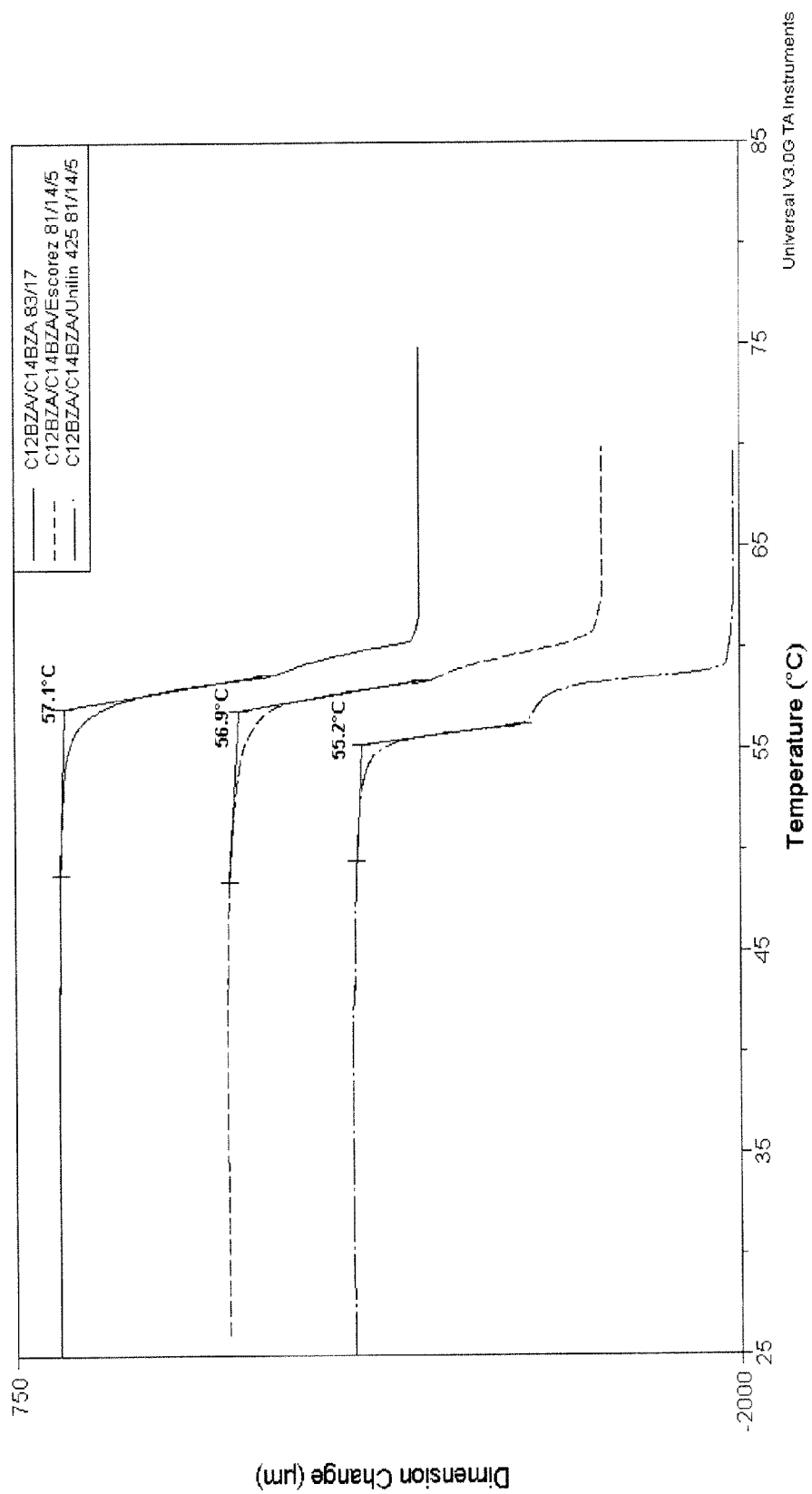
FIG. 1 shows the results of TMA analysis using formulations 7, 8, and 9 in Table 1. The graph indicates the dimensional changes in each formulation as a function of temperature.

Prior to describing the present compositions and methods, the following definitions are provided for clarity. Terms and abbreviations not defined herein should be given their ordinary meaning as used in the art:

As used herein, "alkyl" refers to monovalent alkyl groups having from 1 to 40 carbon atoms, preferably from 1 to 30 carbon atoms and even 10 to 20 carbon atoms. This term is exemplified by groups such as methyl, ethyl, n-propyl, iso-propyl, n-butyl, isobutyl, sec-butyl, t-butyl, n-pentyl, isoamyl, n-hexyl and the like.

As used herein, "substituted alkyl" refers to a monovalent alkyl group having one or more substituents selected from the group consisting of alkoxy, substituted alkoxy, acyl, acylamino, amino, substituted amino, aminoacyl, aryl, substituted aryl, aryloxy, substituted aryloxy, cyano, halogen, hydroxyl, nitro, carboxyl, carboxyl esters, cycloalkyl, substituted cycloalkyl, heteroaryl, substituted heteroaryl, heterocyclic, and substituted heterocyclic.

As used herein, "alkoxy" refers to the group "alkyl-O—" which includes, by way of example, methoxy, ethoxy, n-propoxy, iso-propoxy, n-butoxy, t-butoxy, sec-butoxy, n-pentoxy and the like. "Substituted alkoxy" refers to the group "substituted alkyl-O—".

As used herein, "alkenyl" refers to a monovalent alkenyl group having from 1 to 40 carbon atoms and more preferably 1 to 30, and even 10 to 20 carbon atoms and having at least 1 site of alkenyl unsaturation. The term "alkenyl" encompasses any and all combinations of cis and trans isomers arising from the presence of unsaturation.

As used herein, "substituted alkenyl" refers to alkenyl groups having from 1 to 3 substituents, and preferably 1 to 2 substituents, selected from the group consisting of alkoxy, substituted alkoxy, acyl, acylamino, amino, substituted amino, aminoacyl, aryl, substituted aryl, aryloxy, substituted aryloxy, cyano, halogen, hydroxyl, nitro, carboxyl, carboxyl esters, cycloalkyl, substituted cycloalkyl, heteroaryl, substituted heteroaryl, heterocyclic, and substituted heterocyclic provided that any hydroxyl substitution is not on a vinyl carbon atom.

As used herein, "aryl" refers to a monovalent aromatic carbocyclic group of from 1 to 40 carbon atoms having a single ring (e.g., phenyl) or multiple condensed rings (e.g., naphthyl or anthryl) which condensed rings may or may not be aromatic (e.g., 2-benzoxazolinone, 2H-1,4-benzoxazin-3 (4H)one-7-yl, and the like) provided that the point of attachment is to an aromatic ring atom. Preferred aryls include phenyl and naphthyl, e.g., 2-naphthyl.

As used herein, "substituted aryl" refers to aryl groups which are substituted with from 1 to 3 substituents, and preferably 1 to 2 substituents, selected from the group consisting of hydroxy, acyl, acylamino, alkyl, substituted alkyl, alkoxy, substituted alkoxy, alkenyl, substituted alkenyl, amino, substituted amino, aminoacyl, aryl, substituted aryl, aryloxy, substituted aryloxy, cycloalkoxy, substituted cycloalkoxy, carboxyl, carboxyl esters, cyano, cycloalkyl, substituted cycloalkyl, halo, nitro, heteroaryl, substituted heteroaryl, heterocyclic, substituted heterocyclic, heteroaryloxy, substituted heteroaryloxy, heterocyclyloxy, and substituted heterocyclyloxy.

As used herein, "heteroaryl" refers to a monovalent aromatic group of from 1 to 40 carbon atoms, preferably from 1 to 30 carbon atoms, and even 10 to 20 heteroatoms selected from the group consisting of oxygen, nitrogen, and sulfur within the ring. Such heteroaryl groups can have a single ring (e.g., pyridyl or furyl) or multiple condensed rings (e.g., indolizinyl or benzothienyl). Preferred heteroaryls include quinolinyl, pyridyl, pyrrolyl, indolyl, thiophenyl, and furyl. The nitrogen and/or sulfur atoms within the ring can be optionally oxidized to provide for the N-oxide (NO), S(O) and $S(O)_2$ functionalities. "Substituted heteroaryl" refers to heteroaryl groups that are substituted with from 1 to 3 substituents selected from the same group of substituents defined for substituted aryl.

As used herein, "amino" refers to the group —NH2. "Substituted amino" refers to the group —NR'R" where R' and R" are independently selected from the group consisting of hydrogen, alkyl, substituted alkyl, alkenyl, substituted alkenyl, aryl, substituted aryl, cycloalkyl, substituted cycloalkyl, heteroaryl, substituted heteroaryl, heterocyclic, substituted heterocyclic and where R' and R" are joined, together with the nitrogen bound thereto, to form a heterocyclic or substituted heterocyclic group provided that R' and R" are both not hydrogen.

As used herein, "carboxyl" refers to —COOH or pharmaceutically acceptable salts thereof.

As used herein, "acyl" refers to the groups H—C(O)—, alkyl-C(O)—, substituted alkyl-C(O)—, alkenyl-C(O)—, substituted alkenyl-C(O)—, cycloalkyl-C(O)—, substituted cycloalkyl-C(O)—, aryl-C(O)—, substituted aryl-C(O)—, heteroaryl-C(O)—, substituted heteroaryl-C(O), heterocyclic-C(O)—, and substituted heterocyclic-C(O)—.

As used herein, "tackiness," in all of its forms, generally refers to the property of being sticky to the touch.

II. Temperature Switching Materials

The present temperature switching materials (TSM) are compositions comprising a strengthening agent and a low molecular weight (LMW) organic compound-based material (LMWOC). TSM have narrow thermal transition temperatures and increased mechanical strength compared to conventional precision-melting organic compounds (PMOC), which are generally high molecular weight organic compounds or polymeric materials. TSM to be described represent a new and useful class of thermosensitive materials, which have applications where high strength and narrow melting temperature-compositions are required.

Preferred TSM have a well-defined thermal transition from a solid phase to a liquid phase (i.e., melting point) between about 50° C. and about 120° C. Preferred TSM melt as a mixture within a temperature spread range (or "spread") of about 15° C. Many TSM melt within a spread range of about 10° C. or even about 7° C., or less. All melting points described herein were determined using differential scanning calorimetry (DSC) at a scan rate of 10° C. per minute (calculated based on the melting peak width at ½ peak height). One skilled in the art will appreciate that peak widths observed using scanning calorimetry are dependent on the rate of change of temperature during analysis. Different scan rates will produce different peak widths.

Preferred TSM have a melting point and/or spread temperature substantially the same as the LMWOC they comprise. For example, the melting point or spread of a TSM may be within 3° C., within 2° C., or even within 1° C. of its component LMWOC. TSM may have strength below their melting point that is at least 5%, at least 10%, or even at least about 15% greater than the strength of its component LMWOC.

Thermal and mechanical properties of TSM can be tested by assembling a test device wherein components are held together by a TSM and subjected to mechanical stress at different temperatures to measure their strength. Such assays are commonly used to measure the strength of conventional adhesives. An exemplary device assembled using TSM is a disposable temperature sensors, such as the device described herein. Numerous other devices can be made.

Preferred TSM exhibit narrow triggering/firing temperature spread ranges when used to prepare such devices. Preferred firing temperature spreads are within about ±2° C. of a temperature of interest, or even within about ±1° C. of a temperature of interest. Accordingly, the spread of the firing temperature is about 5° C. or less, 4° C. or less, or even 3° C. or less.

Additional materials can be added to the TSM compositions, so long as they do not substantially affect strength and melting point spread. Exemplary additional materials include but are not limited to emulsifiers and surfactants.

TSM can be used in a variety of commercial products, most notably those requiring a low toxicity, low cost, high-strength, narrow-melting range thermosensitive composition.

Exemplary strengthening agents and LMWOC are described below, along with exemplary formulations and related physical data.

III. Strengthening Agents

Strengthening agents are organic materials conventionally added to high molecular weight (HMW) polymeric compositions to increase their mechanical strength. Strength is typically demonstrated by increased strength in tension, compression, shear, or combinations, thereof. Increased strength may be embodied in increased adhesive strength or increased "tackiness." One class of strengthening agent that is suitable for use in TSM is the "tackifiers." A well-known use of strengthening agents is in preparing pressure-sensitive adhesives, including the "hot melt" type.

Strengthening agents are typically low molecular weight (500-5,000 Da) compounds that include naturally-occurring products derived from plant materials. A major class of strengthening agents is the rosins, which may be isomerized to rearrange carbon-carbon (C—C) double-bonds and/or reacted with alcohols to produce rosin esters. The selection of rosins, isomers, and esters determines the strengthening properties.

Synthetic strengthening agents generally include hydrocarbon resins and hydrogenated hydrocarbon resins. C5 and C9 feedstocks are commonly used as staring materials to produce synthetic strengthening agents, although this terminology is often used for convenience rather than technical accuracy. C5 (aliphatic) feedstocks include cis and trans-1,3-pentadiene, 2-methyl-2-butene, cyclopentadiene, cyclopentrene, and the like. C9 (aromatic) feedstocks include vinyltoluene, dicyclopentadiene, indene, methylindene, styrene, methylstyrene, ethylene-vinyl acetate, and the like. Preferred feedstocks are readily obtained, inexpensive, and minimally toxic. C5, C9, or other feedstocks, or mixtures, thereof, can be polymerized to produce a hard resin using a Lewis acid catalyst, at a preselected temperature and pressure, to obtain a product with a desired molecular weight. Synthetic as well as naturally-occurring strengthening agents can be modified by hydrogenation to remove double-bonds, thereby forming hydrogenated hydrocarbon resins.

Exemplary resin-based strengthening agents include (poly)terpenes, monomeric and/or polymerized petroleum hydrocarbons, phenolic resins, terpene phenolic resins, coumarone-indene resin, aliphatic hydrocarbon resin, aromatic hydrocarbon resin, aliphatic/aromatic copolymerizable hydrocarbon resin, alicyclic hydrocarbon resin, terpene hydrocarbon resin, low-molecular styrene resin, rosin hydrocarbon resin, phenol-formaldehyde type resins, polybutene, liquid polybutadiene, special polymerized polyester, turpentine-based strengthening agent, xylene-formaldehyde resin, and tertiary butyl phenolic formaldehyde.

Commercially available mixed C5/C9 (aliphatic/aromatic) resins and heat reactive hydrocarbons include "tackifiers" such as ESCOREZ, WINGTACK, PICOLYTE, PICCOTAC, REGALREZ, HERCOTAC, NOVARES TK, and RIBETAK (Table 2). Some commercial products are available in ranges of molecular weights, with different softening temperatures. For example, the ESCOREZ 5300 family of cycloaliphatic (i.e., terpene-based) hydrocarbon resins and the ESCOREZ 5600 family of modified cycloaliphatic hydrocarbon resins, are available as shown, below. Several of these compounds were tested in exemplary TSM formulations. The names, compositions, properties, and sources of several strengthening agents are provided in Table 2. Strengthening agents are also described in appropriate references (e.g., Schlademan (1999) "Tackifier Resins," in *Handbook of Pressure Sensitive Adhesive Technology*, pp. 609-631).

| | ESCOREZ Product | | | | | | | |
|---|---|---|---|---|---|---|---|---|
| | 5380 | 5300 | 5320 | 5340 | 5600 | 5615 | 5637 | 5690 |
| Temp. (° C.) | 85 | 105 | 122 | 140 | 103 | 118 | 130 | 90 |
| Mol. Wt. (Da) | 370 | 420 | 430 | 460 | 520 | 560 | 500 | 480 |

Ideal strengthening agents for use in the present compositions have a molecular weight of from about 500 to about 5,000 Da, and are either non-crystalline (i.e., amorphous) or have a total crystallinity of less than 10 joules. Where the LMWOC is a fatty acid, strengthening agents with higher total crystallinity, or even crystalline strengthening agents, may also produce acceptable results.

The strengthening agent may have a softening/melting point at least about 10° C., at least about 15° C., or at least about 20° C. above that of the LMWOC in the composition. The strengthening agent should be soluble in a preselected melted/molten LMWOC at about 5-10° C. above its melting point.

A feature of TSM is that the strengthening agent is present only as a minor component. In preferred embodiments, the strengthening agent is present in an amount of from about 1-20%, from about 1-15%, from about 1-10%, from about 1-7.5%, from about 2-7.5%, or even from about 3-7%. The strengthening agent should be combined with a LMW hydrocarbon material that is at least 95% pure, at least 98% pure, or even at least 99% pure.

IV. Low Molecular Weight Organic Material Compositions

Low molecular weight (LMW) organic compound-based materials (LMWOC) are discrete, non-polymeric materials, which serve as the major component of the present TSM. In some embodiments, TSM comprise a single LMWOC. In other embodiments, TSM comprise a plurality of LMWOC.

Preferred LMWOC (whether a single compound or plurality of compounds) have a sharp melting point at about 50-120° C., about 50-100°, or even about 80-120° C., and have a melting point spread range of less than about 10° C. The LMWOC is at least 95% pure, at least 98% pure, or even at least 99% pure. Particularly where the LMWOC are for use in the food and medical fields, the compounds are preferably of low toxicity. Low cost may also be a consideration.

Exemplary LMWOC are crystalline, non-polymeric organic compounds, including C12-C18 alkyl benzamides, C12-C16 bisalkylamides, C8-C22 benzamides, C8-C18 dialkyl amides, C12-C22 n-alkyl carboxylic acids, esters (e.g., alkyl esters), C14-C44 hydrocarbons, ethers (e.g., dialkyl ethers), n-alkyl alcohols or diols, ketones (e.g., dialkyl ketones such as myristone (C14), palmitone (C16), and sitearone (C18)), anilides (e.g., C12-C18 n-alkyl anilides), phthalimides, phthalate esters, phthalamides, orthophthalate esters, orthophthalamides, and derivatives, and other LMWOC identified herein and known in the art. Where the LMWOC are fatty acids, C14-C22 fatty acids are acceptable. C14, C16, and C18 fatty acids are preferred because they are readily available in suitably pure form. Where the LMWOC are ketones, they may be referred to by specifying the acid from which they are derived, for example, a ketone derived from stearic acid (e.g., stearone), a ketone derived from palmitic acid (palmitone), a ketone derived from behenic acid (behenone), and the like. Exemplary ketones are aliphatic ketones.

In some embodiments, the LMWOC have a structure of the group consisting of materials of the general structure $R^1$—C(O)—X—Y, where $R^1$ is alkyl, substituted alkyl, alkenyl, substituted alkenyl, aryl, substituted aryl, or heteroaryl, X is OH, O, N, COOH, CH, $CH_2$, $NH_2$, substituted amino, or a bond, and Y is an alkyl, substituted alkyl, alkenyl, substituted alkenyl, aryl, substituted aryl, heteroaryl, H, or absent. In other embodiments, the LMWOC are selected from a hydrocarbon having between about 12-44 carbon atoms; an alcohol having between about 12 and 22 carbon atoms; an ether ($R^3$—C(O)—$R^4$), wherein $R^3$ and $R^4$ are independently is an alkyl having between about 8-20 carbon atoms; and a phthalate.

In some embodiments, the LMWOC has the general structure $R^1$—C(O)—NH—$R^2$, where $R^1$ is aryl and $R^2$ are saturated alkyls having between 8-22 carbon atoms. The saturated alkyls may be selected independently. In some embodiments, the LMWOC has the general structure $R^1$—C(O)—OH, where $R^1$ is a saturated alkyl having between 8-22 carbon atoms. In some embodiments, $R^1$ has 12 carbon atoms (lauric acid), 14 carbon atoms (myristic acid; MA), 16 carbon atoms (palmitic acid; PA), 18 carbon atoms (stearic acid), 20 carbon atoms, (Arachidic acid), 22 carbons (behenic acid), or 24 carbon atoms (Lignoceric acid). In some embodiments, the first material has the general structure $R^1$— C(O)—O—Y, where $R^1$ and Y are independently a saturated alkyl having between 8-22 carbon atoms. In still further embodiments, the first material has the general structure $R^1$—C(O)—NH—Y, where $R^1$ is a saturated alkyl having between 8-22 carbon atoms and Y is aryl.

In some embodiments, the LMWOC has the general structure $R^3$—C(O)—NH—$R^4$, where $R^3$ is aryl and $R^4$ is a saturated alkyl having between 8-22 carbon atoms, wherein the number of carbon atoms in $R^3$ differs from the number of carbon atoms in $R^4$ by an absolute value of four or less. In some embodiments, the LMWOC has the general structure $R^3$—C(O)—OH, where $R^3$ is a saturated alkyl having between 8-22 carbon atoms, and wherein the number of carbon atoms in $R^3$ differs from the number of carbon atoms in $R^1$ by an absolute value of four or less.

In yet further embodiments, the LMWOC is a composition resulting from the mixture of similar or different LMWOC, such as those described, herein. For example, the LMWOC may result from the mixture of a ketone, aldehyde, or organic acid with an amide to produce a eutectic blend Such composition are herein referred to as eutectic LMWOC, which are encompassed by the term "LMWOC" unless excluded by proviso or by context. A particular eutectic LMWOC is the mixture of steady stearmaide (e.g., Kemamide S180) and stearone. This use of this amide in producing this eutectic LMWOC is distinct from its use as a strengthening agent. It has been discovered that the addition of a strengthening agent, such as Escorez 1315 to a eutectic composition increases its pull strength while decreasing its firing spread. This result is unexpected in view of the prior art, since a mixture typically demonstrates a broader melting point than a pure substance Other eutectic compositions are expected to behave in a similar manner in the presence of a strengthening agent.

In some embodiments, the TSM consist of a single LMWOC and single strengthening agent. In other embodiments, one or more LMWOC may be used in combination with one or more strengthening agents. Formulations comprising a plurality of LMWOC (e.g., fatty acids, alkyl amides, and benzamides) are shown in Table 1. Unexpectedly, some of these mixed LMWOC produced TSM with narrow melting peaks, characteristic of single LMWOC-containing TSM. Where the LMWOC is a combination of fatty acids, the lower molecular weight fatty acid should be in abundance (i.e., greater than 50% of the material).

LMWOC have several advantages over conventional polymeric materials, which are used in some temperature sensitive compositions. For example, LMWOC are readily available in purified form and represent a homogenous population of molecules (within purity and other limits as apply), while polymeric materials are typically available in size ranges, which are inherently heterogenous. LMWOC are largely fatty acids and their derivatives, which are renewable and naturally occurring, while polymeric materials are largely petroleum based, which is non-renewal and increasingly expensive. In addition, LMWOC are easily mixed at lower temperatures, to ease and improve mixing and promote uniformity in mixtures.

V. Temperature Cycling

A feature of the present TSM is their ability to retain their melting characteristics through multiple heat cycles. Natural polymers such as rubbers, cellulosic materials, and other biologic materials have limited utility for most temperature cycling processes because temperature-dependent changes in their physical properties are usually irreversible.

TSM can be cycled through their melting point several times without changing their basic structure. This feature allows TSM to be used in non-disposable (i.e., reusable) devices for measure and/or indicating temperature transitions. Exemplary devices can be used two, three, or more times.

One skilled in the art will recognize that once "fired" in response to an elevated temperature, a device comprising a TSM may require "resetting" to the low-temperature position. This is typically accomplished by manually (or via machine) reverting a "fired" device to the low temperature position (while the device is above the firing temperature), and then cooling the device to solidify the TSM.

VI. Devices Comprising TSM Compositions

The ability to produce TSM with a narrow transition temperature and high-strength, permits the manufacture and use of disposable and other temperature indicators for a wide variety of use in the food and medical field. In particular, the TSM composition can be used to manufacture a device with a trigger temperature of between about 50-120° C., where most food preparation is performed. This range also encompasses physiological (e.g., mammals) temperature, indoor and outdoor ambient temperatures, etc. Accordingly, the present compositions and methods are useful for preparing a mechanical temperature indicator for a wide variety of sensing applications, wherein reaching a critical temperature cause a phase change in the TSM, permitting any number of forms of mechanical movement.

One exemplary use for the present compositions and methods is for disposable indicators for measuring the temperature beneath the surface of meat or poultry, particularly for ensuring thorough cooking of such food products. Such indicators are commonly referred to as "pop-up" or "pop-it" temperature indicators, or thermoresponsive devices.

An exemplary temperature indicator/monitoring device includes a barrel, which is typically a monolithic molded body made of a material capable of withstanding the elevated temperatures encountered in a cooking environment. Nylon is an exemplary material, although other materials could be adapted for use in the cooking environment as well. The barrel may include a lower barrel end adapted for insertion into a food item and may be provided with one or more barbs radially disposed near the lower barrel end for retaining the temperature monitoring device in the food once inserted. The barrel also includes an annular flange located adjacent to the upper barrel end. The flange may be of varying radial dimensions so as to contact the surface of the food item when temperature monitoring device is inserted therein to prevent further insertion.

The barrel, or fixed member, communicates through an orifice with a cavity (or lumen) adapted to contain at least part of an indicator, such as a plunger, that is disposed through the orifice of the barrel and is maintained in slidable relation thereto within the cavity. The indicator, or movable member, is adapted to travel between a retracted position and an extended position. Means can be provided to resiliently bias the indicator toward one position, for example, the extended position. A useful biasing means is a spring. Other biasing means take advantage of certain materials natural tendency to return to a preformed position.

Retaining means are provided to maintain the indicator in a retracted position against the force of the spring or other biasing means prior to use. The retaining means may be a TSM composition, as described herein. The retaining material is positioned within the cavity to mechanically interfere with movement of the indicator from a retracted position to an extended position, under force of the biasing means.

At temperatures below the melting/softening/phase transition temperature of the TSM, the indicator is maintained in a retracted position by the retaining material, which may take the form of an adhesive ring or plug preventing movement of the indicator in the barrel. Following exposure to an elevated temperature at or near the melting/softening/phase transition temperature of the TSM, the composition yields, allowing the indicator to move to the extended position under force of the spring.

Movement of the indicator to the extended position provides a visual indication of the attainment of the specified temperature; although, the indicator can be connected to a switch or used to initiate any number of downstream events. As used herein, yield means fuse, melt, plasticize, or become ductile, malleable, or deformable to the point where the TSM has insufficient strength to maintain the indicator in a retracted position against the pressure of spring. In some cases, the TSM may liquefy, and thereafter function as a lubricant to facilitate movement of the indicator. Such temperature indicator devices are described, for example, in U.S. Pat. Nos. 7,204,199, 5,988,102, and 5,799,606, incorporated by reference. Exemplary devices are described in Examples 2 and 3, below.

The present TSM compositions can also be used to replace eutectic alloys and other temperature sensitive compositions in such devices as fire sprinklers. An exemplary fire sprinkler is described in Examples 4.

VII. Experiments Performed in Support of the Invention

In a series of experiments performed in support of the present TSM and related aspects, a variety of strengthening agents were tested in combination with a variety of LMWOC (i.e., C12-C18 alkyl benzamides, C12 to C16 dialkyl amides, C14 to C18 carboxylic acids, fatty acids, fatty alcohols, and fatty esters) to produce TSM for testing in disposable temperature indicators. Such devices are suitable for monitoring the cooking temperature of food, such as a meat, sea food, or poultry.

The devices included a spring loaded plunger in a barrel, held against a compressed spring. The plunger was held in place in the barrel by a test composition (TSM), which acted as a structural element (i.e., an adhesive) to prevent the plunger from moving in the barrel under the force of the spring. When the device was heated to the critical temperature (i.e., the softening, melting, or phase-transition temperature) of the TSM, the plunger became free to move within the barrel under force of the spring. This movement served as a visual indication for "activation" of the device, which was triggered upon reaching the critical temperature. The plunger could also be linked to a switch or other device to produce a downstream signal. About 10-20 devices (typically about 15) were made to test each formulation.

The TSM were then tested for several physical properties, including the softening/melting point of the composition, the melting temperature spread, and stability (Table 1). Mechanical strength was determined with a pull test, as described in, e.g., U.S. Pat. No. 7,204,199. The ability of a disposable temperature indicator to support increased weight in the pull test indicated improvement mechanical strength of the TSM composition.

Several formulations containing strengthening agents showed increased mechanical strength, compared to the component LMWOC in the absence of a strengthening agent. Moreover, several formulations containing strengthening agents showed no substantial change to the softening/melting temperature or broadening of the melting temperature spread. These results were unexpected for several reasons. First, the addition of an organic impurity to a pure organic compound is known to lower the overall melting point, and broaden the phase transition peak. Second, some of the component LMWOC are notably lacking in mechanical strength in their pure form (e.g., fatty acids) yet produced TSM with substantial mechanical strength.

Other formulations containing a LMWOC and strengthening agent showed peak broadening compared to the component LMWOC. These results were as expected in view of the prior art. Thus only a subset of the tested TSM formulations tested demonstrated both narrow melting peaks and increased strength. Exemplary formulations, and data obtained, therefrom, are described in Table 1, below. Additional information relating to the strengthening agents is shown in Table 2, below.

Differential scanning calorimetry (DSC) was performed at a rate of 10° C. per minute on some TSM formulations and their component LMWOC to compare and measure their melting temperatures and temperature spreads. In addition, thermal mechanical analysis (TMA) was performed to measure the change in dimensions (µm), as a function of temperature (° C.). Exemplary results are shown in FIGS. 1-4.

FIG. 1 shows the results of TMA analysis using C12:C14 benzamide formulations containing no strengthening agent, 5% ESCOREZ 5380, or 5% UNILIN 425 (i.e., formulations 9, 8, and 7, respectively, in Table 1). The data show that the phase-transition curve of the C12:C14 benzamide formulation did not substantially change upon addition of the strengthening agent ESCOREZ 5380. However, addition of the strengthening agent UNILIN 425 significantly changed the softening properties and broadened the phase-transition curve, demonstrating that crystalline strengthening agents are generally unacceptable as modifying agents for amide type LMWOC.

Figure 2:
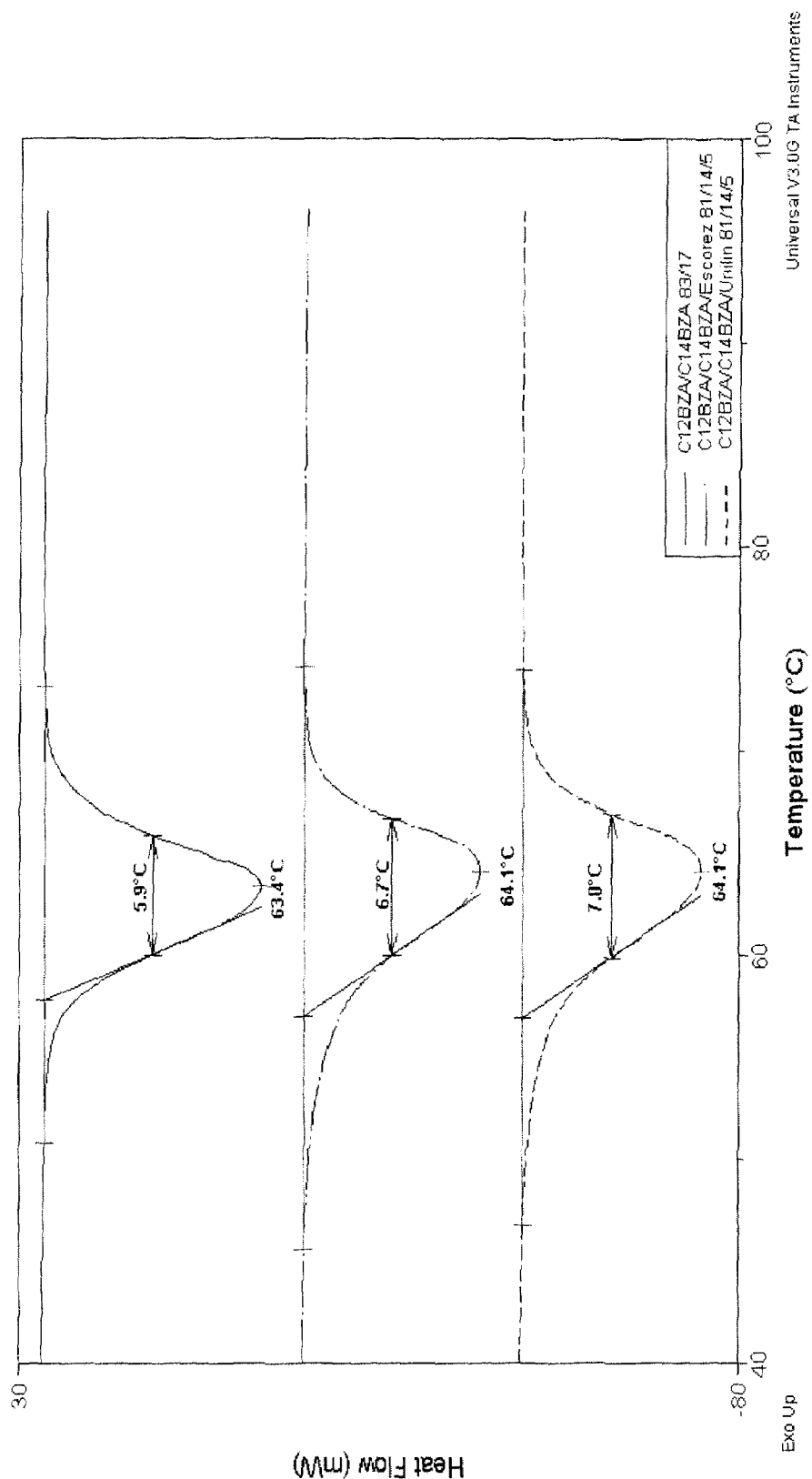
FIG. 2 shows the results of DSC analysis using formulations 7, 8, and 9 in Table 1. The graph indicates peak melting temperatures and peak widths at half-maximal peak height.

FIG. 2 shows the results of DSC analysis using the same C12:C14 benzamide formulations. The addition of UNILIN 425 shifted and broadened the melting peak of the C12:C14 benzamide formulation significantly more than the addition of ESCOREZ 5380. These results are consistent with the device properties shown in Table 1, wherein the addition of ESCOREZ 5380 to the C12:C14 benzamide formulation resulted in a device with a narrow temperature spread temperature and high strength, while the addition of UNILIN 425 resulted in a device with a broad spread temperature.

Figure 3:
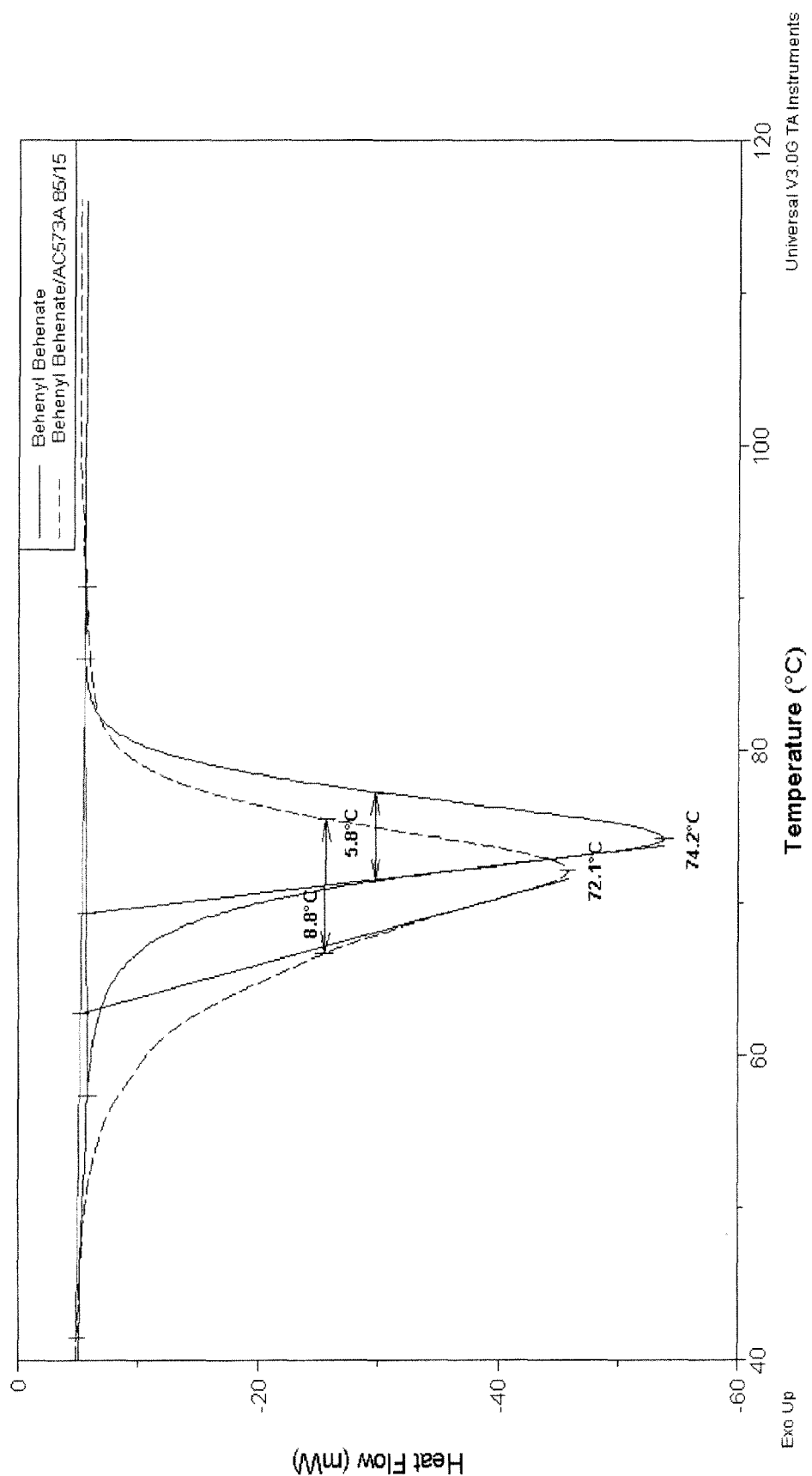
FIG. 3 shows the results of DSC analysis using formulations 4 and 5 in Table 1. The graph indicates peak melting temperatures and the peak widths at half-maximal peak height.

FIG. 3 shows the results of DSC analysis using behenyl behenate with or without AC WAX 573 as a strengthening agent (i.e., formulations 5 and 4, respectively; in Table 1). The addition of AC WAX 573 significantly lowered the melting point and increases the melting point spread of the behenyl behenate formulation. These results are consistent with the device properties shown in Table 1, wherein the addition of AC WAX 573 also lowered the melting point and increases the melting point spread, making the formulation unsuitable for use as described. This demonstrates again that crystalline strengthening agents are not acceptable for modification of ester based LWMOC.

Figure 4:
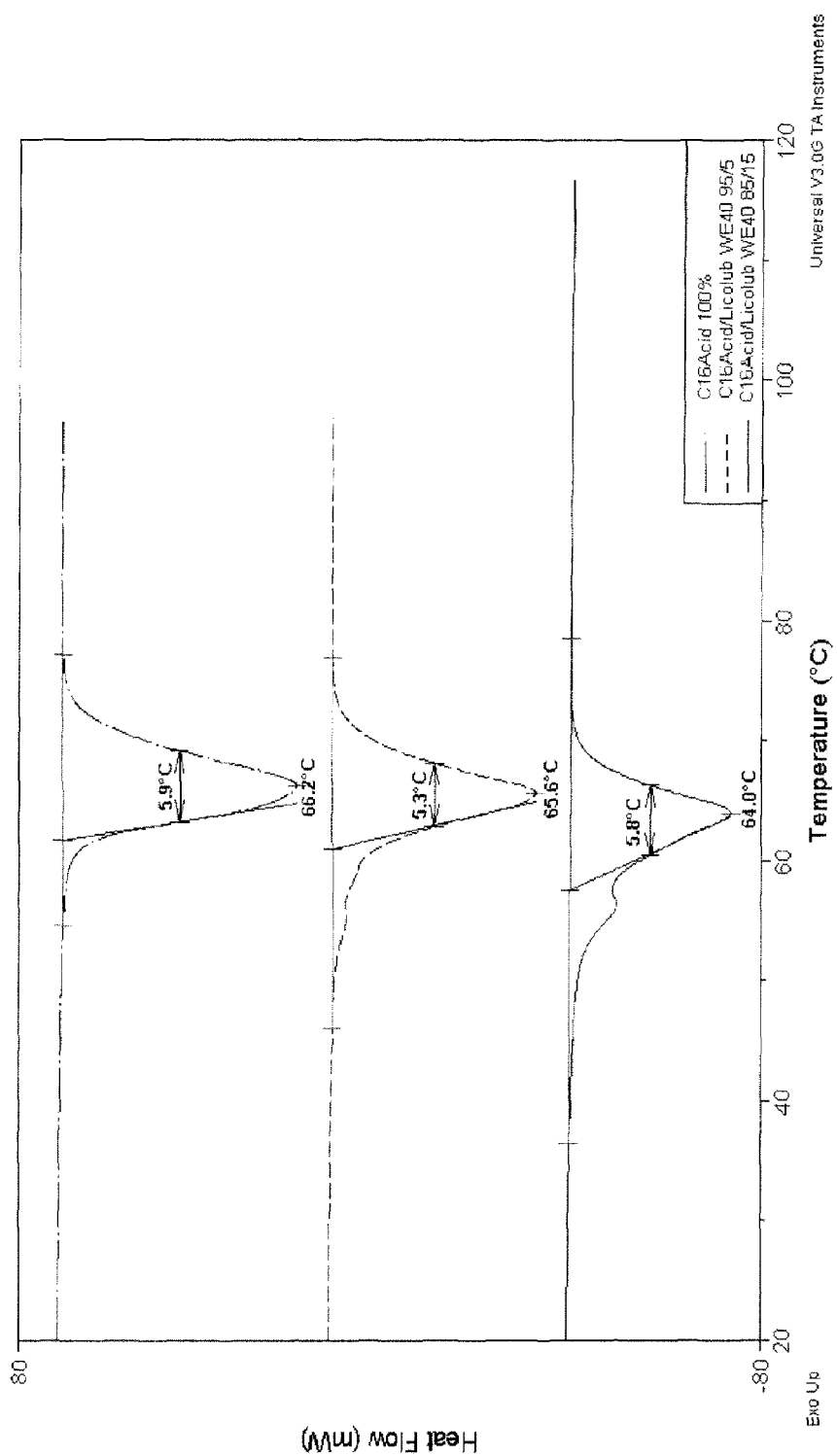
FIG. 4 shows the results of DSC analysis using formulations 18, 23, and 24 in Table 1. The graph indicates peak melting temperatures and the peak widths at half-maximal peak height.

FIG. 4 shows the results of DSC analysis using C16 fatty acid formulations containing no strengthening agent, 5% LICOLUB WE40, or 15% LICOLUB WE40 (i.e., formulations 18, 23, and 24, respectively, in Table 1). While the addition of 5% LICOLUB WE40 minimally shifted the melting point of the fatty acid formulation and actually reduced the spread temperature, addition of 15% LICOLUB WE40 more significantly shifted the melting temperature and began to broaden the melting peak. These results are consistent with device properties shown in Table 1, wherein the formulation containing 5% LICOLUB WE40 demonstrated a narrow temperature spread and high strength, while the formulation containing 15% LICOLUB WE40 has a broader temperature spread.

This result is surprising in view of the finding that crystalline strengthening agents are not acceptable for use with amide or ester based LWMOC. Moreover, while fatty acids generally lack the mechanical strength for use in a thermomechanical device, it was found that fatty acids can be strengthened with out degrading their thermal properties by addition of small amounts of either crystalline or amorphous strengthening agent having a molecular weight of from about 500 to 5,000 daltons and a melting or softening point at least about 10° C. greater than the fatty acid LMWOC. Although the reason for these results is not know, it may have to do with the unusual dimerization tendency of fatty acids.

Where tested, DSC and TMA data were generally consistent with data obtained using the disposable temperature indicators. Since testing in the disposable indicators further provided data relating to composition strength, such data were considered more useful for evaluation the various tested formulations.

Numerous other embodiments of the present compositions and methods will be apparent to one skilled in the art upon reading the disclosure.

EXAMPLES

The following examples are illustrative in nature and are in no way intended to be limiting.

Example 1

Formulations

The formulations shown in Table 1 were prepared using standard methods. Transition temperature, spread, and structural integrity data were obtained using the formulations in exemplary disposable temperature indicator devices. Structural integrity was determined using a pull test, wherein the plunger/stem was pulled with a hanging weight while the barrel was secured in a fixed position (see, e.g., U.S. Pat. No. 7,204,199; Volk Enterprises, Inc. (Turlock, Calif.)). Where present, numbers in parenthesis in Table 1 indicate the overall composition of the formulation. Additional information relating to strengthening agents is shown in Table 2.

DSC and TMA analyses were performed on some formulations using a Universal V3.0G TA Instrument. The results generally agreed with those obtained using the disposable temperature indicator devices. Exemplary DSC and TMA results are shown in FIG. 1-4.

TABLE 1

Exemplary TSM compositions

| | LMW Hydrocarbon* | Additive | % | Device Properties | | | Compound Properties | |
|---|---|---|---|---|---|---|---|---|
| | | | | Firing °C. | Spread °C. | Pull Lbs. | Melting Temp (°C.) | |
| | | | | | | | Point | Range |
| 1 | Stearyl alcohol | None | 0 | 56.4 | 2.2 | 2 | 60.3 | 7.2 |
| 2 | Stearyl alcohol (95:5) | AC Wax 5120 | 5 | 57.1 | 2.8 | 3 | 61.5 | 7.8 |
| 3 | Stearyl alcohol (95:5) | Escorez 5340 | 5 | 54.6 | 1.7 | 4.5 | 60.2 | 6.1 |
| 4 | Behenyl behenate | None | 0 | 66.9 | 3.9 | 6.6 | 74.2 | 5.8 |
| 5 | Behenyl behenate (85:15) | AC Wax 573A | 15 | 62.5 | 4.4 | 5.4 | 72.1 | 8.8 |
| 6 | C12:C14 BZA (76.5:13.5:10) | Unilin 425 | 10 | 54.4 | NA | 5.2 | 62.5 | 6.8 |
| 7 | C12:C14 BZA (81:14:5) | Escorez 5380 | 5 | 60.6 | 1.7 | 6.3 | 64.1 | 6.7 |
| 8 | C12:C14 BZA (81:14:5) | Unilin 425 | 5 | 57.5 | 5.6 | 5.2 | 64.1 | 7 |
| 9 | C12:C14 BZA (83:17) | None | 0 | 60.3 | 1.1 | 4.4 | 63.4 | 5.9 |
| 10 | C12:C14 BZA (85:15) | None | 0 | 61.2 | 1.1 | 4 | 65.1 | 6.4 |
| 11 | C14 MA | None | 0 | 54.4 | 1.1 | 4.4 | 56.8 | 5.7 |
| 12 | C14 MA | Escorez 5380 | 10 | 52.9 | 1.1 | 7 | 56.1 | 6.3 |
| 13 | C14:C14 alkyl amide | None | 0 | 84.1 | 1.1 | 4.8 | 87.8 | 4.5 |
| 14 | C14:C14 alkyl amide (95:5) | Kemamide S180 | 5 | 83.3 | 2.5 | 5.9 | 86.4 | 6.2 |
| 15 | C14:C16 BZA (85:15) | None | 0 | 69.5 | 1.7 | 4 | 73.7 | 6.2 |
| 16 | C14:C16 BZA (88:9:3) | Escorez 5380 | 3 | 71.7 | 1.7 | 7 | 74.7 | 5.9 |
| 17 | C14 MA:C16 PA (90:5:5) | Escorez 5380 | 5 | 51.7 | 1.7 | 6.4 | 54.8 | 5.4 |
| 18 | C16 PA | None | 0 | 63.3 | 1.1 | 4.8 | 66.1 | 6.0 |
| 19 | C16 PA (80:20) | AC wax 5120 | 20 | 56.3 | 3.8 | 6.9 | 61.8 | 12.3 |
| 20 | C16 PA (95:5) | Kemamide S180 | 5 | 62.2 | 1.1 | 6 | 66.2 | 6.9 |
| 21 | C16 PA (95:5) | AC wax 5120 | 5 | 61.7 | 1.1 | 6.8 | 65.7 | 6.5 |
| 22 | C16 PA (95:5) | Polywax 500 | 5 | 62.2 | 0.6 | 6 | 65.4 | 6.2 |
| 23 | C16 PA (95:5) | Licolub WE40 | 5 | 61.6 | 1.7 | 5.8 | 65.6 | 5.3 |
| 24 | C16 PA (85:15) | Licolub WE40 | 15 | 58.4 | 3.6 | 5.9 | 63.4 | 11.5 |
| 25 | C16 PA (95:5) | Multiwax W445 | 5 | 62.1 | 1.1 | 4.2 | 64.2 | 5.6 |
| 26 | C16 PA (95:5) | Escorez 1315 | 5 | 62.8 | 1.1 | 7 | 65.9 | 5.9 |
| 27 | C16 PA (95:5) | Escorez 2203 | 5 | 62.7 | 1.1 | 7 | 66.1 | 6.3 |

TABLE 1-continued

Exemplary TSM compositions

| | LMW Hydrocarbon* | Additive | % | Device Properties Firing °C. | Spread °C. | Pull Lbs. | Compound Properties Melting Temp (°C.) Point | Range |
|---|---|---|---|---|---|---|---|---|
| 28 | C16 PA (95:5) | Escorez 5340 | 5 | 62.2 | 0.6 | 6.2 | 65.4 | 6.2 |
| 29 | C16 PA (95:5) | Sylvatac RE40 | 5 | 62.2 | 0.6 | 6.2 | 65.1 | 5.4 |
| 30 | C16 PA (95:5) | Sylvatac Re100 | 5 | 62.5 | 1.1 | 7 | 65.2 | 6.7 |
| 31 | C16 PA (95:5) | Sylvaros PR140 | 5 | 62.2 | 1.1 | 6.8 | 64.9 | 5.7 |
| 32 | C16:C18 BZA (68:27:5) | Kemamide S180 | 5 | 70.7 | 1.1 | 5.2 | 76.9 | 6.7 |
| 33 | C16:C18 BZA (72:28) | None | 0 | 71.0 | 2.2 | 4 | 77.7 | 5.6 |
| 34 | C16:C18 BZA (85:11:3) | Escorez 5380 | 3 | 74.3 | 2.2 | 5 | 78.0 | 5.6 |
| 35 | C16:C18 BZA (85:15) | None | 0 | 73.7 | 1.7 | 2 | 77.2 | 5.3 |
| 36 | C18 SA | None | 0 | 68.8 | 1.7 | 4.6 | 71.6 | 6.5 |
| 37 | C18 SA (92:8) | Escorez 5380 | 8 | 67.9 | 2.2 | 6.4 | 70.7 | 6.4 |
| 38 | C18 SA (95:5) | Escorez 5380 | 5 | 68.3 | 1.7 | 5.4 | 71 | 5.6 |
| 39 | C12:C12 alkyl amide | None | 0 | 75.7 | 2.2 | <3 | 78.9 | 4.4 |
| 40 | C12:C12 alkyl amide (95:5) | Escorez 5380 | 5 | 73.5 | 1.1 | 5 | 77.5 | 6.1 |
| 41 | C12:C12 alkyl amide (95:5) | Kemamide S180 | 5 | 77.5 | 1.7 | 5.5 | 77.9 | 6.2 |
| 42 | 1,12 dodecane diol | None | 0 | 81.5 | 1.2 | 3.0 | 83.5 | 4.9 |
| 43 | 1,12 dodecane diol 95:5 | Ethylene bis dodecamide | 5 | 80.6 | 1.4 | 6.1 | 82.8 | 5.5 |
| 44 | 1,12 dodecane diol 90:15 | AC wax 5120 | 10 | 79.3 | 3.2 | >7 | 82.1 | 6.8 |
| 45 | Stearone | None | 0 | 87.8 | 2.2 | 4.2 | 91.8 | 6.6 |
| 46 | Stearone (97/3) | Escorez 1315 | 3 | 87.7 | 1.7 | 5.2 | 92.1 | 6.1 |
| 47 | Stearone (95/5) | Escorez 1315 | 5 | 87.4 | 2.8 | 5.2 | 91.5 | 6.3 |
| 48 | Stearone/Kemamide (85/15) | None | 0 | 84.7 | 1.1 | 6.0 | 87.7 | 6.7 |
| 49 | Stearone/Kemamide S180 (87/10/3) | Escorez 1315 | 3 | 85.6 | 1.7 | 7.0 | 89.2 | 7.0 |

*BZA: benzamide, PA: palmitic acid, MA: myristic acid

TABLE 2

Exemplary strengthening agents

| Additive | Type | Supplier | SP† (°C.) | MP‡ (°C.) |
|---|---|---|---|---|
| AC WAX 5120 | ethylene/acrylic acid copolymer | Honeywell | | 92 |
| AC WAX 573A | ethylene/maleic anhydride copolymers | Honeywell | | 106 |
| ESCOREZ 1315 | aliphatic resin | Exxon-Mobil | 112-116 | NA |
| ESCOREZ 2203 | aliphatic resin | Exxon-Mobil | 89-96 | NA |
| ESCOREZ 5340 | cycloaliphatic | Exxon-Mobil | 140 | NA |
| ESCOREZ 5380 | cycloaliphatic | Exxon-Mobil | 85 | |
| KEMAMIDE S180 | monoamide | Crompton | | 93 |
| LICOLUB WE40 | pentaerythritol ester of montanic acid | Clariant | | 73-79 |
| LICOLUB WE4 | glycerol ester of montanic acid | Clariant | | |
| LICOMONT NAV101 | sodium salt of montanic acid. | Clariant | | |
| MULTIWAX W445 | Microcrystalline wax | Crompton | | 30-80 |
| POLYWAX 500 | polyethylene wax | Crompton | | 88 |
| SYLVAROS PR140 | polymerized rosin | Arizona Chemical | 140 | |
| SYLVATAC RE100 | pentaerythritol ester of rosin | Arizona Chemical | 100 | |
| SYLVATAC RE40 | rosin ester | Arizona Chemical | 40 | |
| UNILIN 425 | primary linear alcohol | | | 91 |
| WINGTACK 86 | aliphatic/aromatic resin | Goodyear | 87 | |
| WINGTACK 95 | aliphatic/aromatic resin | Goodyear | 96 | |
| WINGTACK EXTRA | aliphatic/aromatic resin | Goodyear | 97 | |
| PICOLYTE S115 | aliphatic/aromatic resin | Eastman | 115 | |
| PICCOTAC 1100 | aliphatic/aromatic resin | Eastman | 100 | |

†SP: softening point,
‡MP: melting point

Example 2

Temperature Indicator/Monitoring Device

Figure 5:
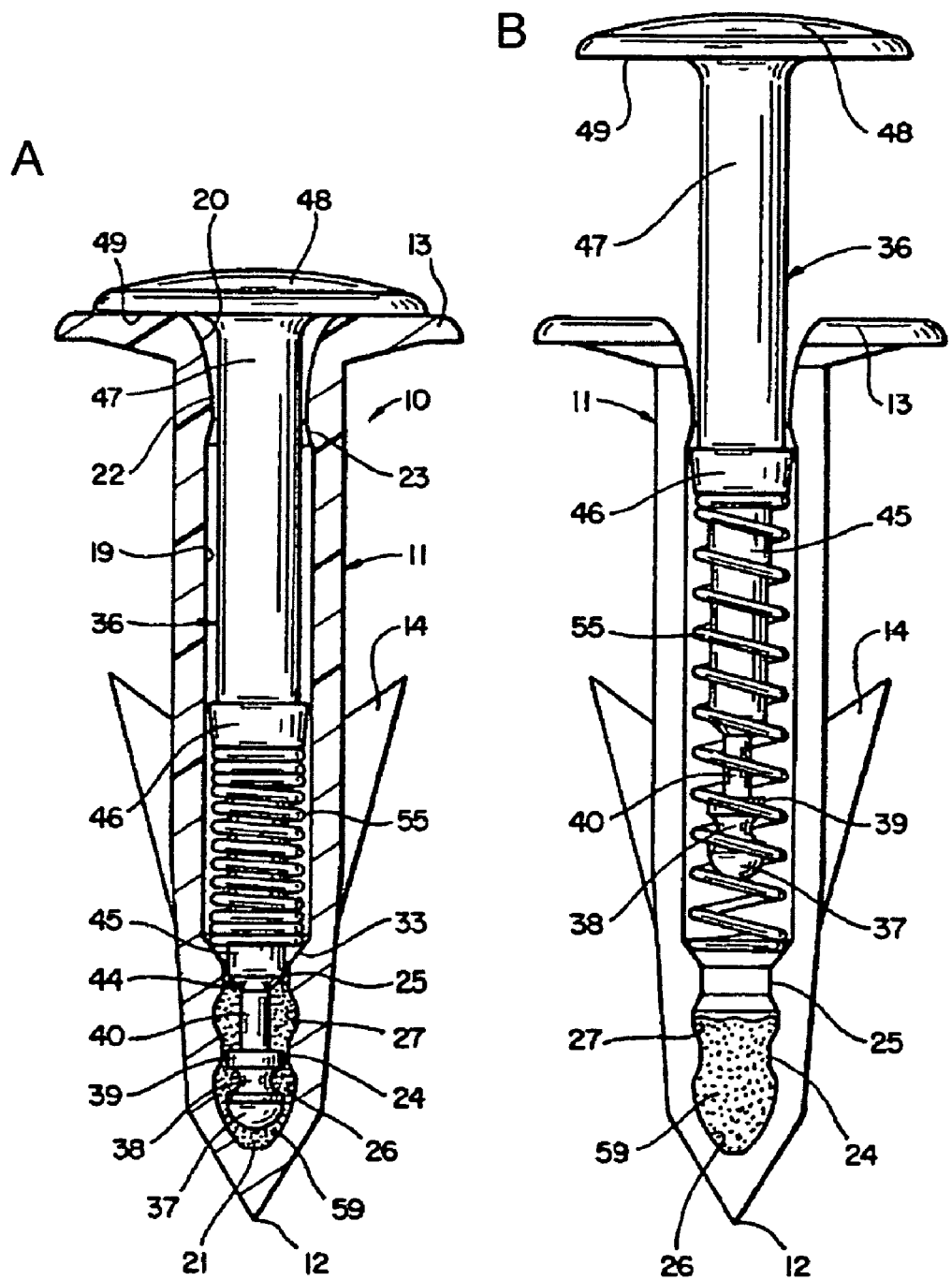
FIGS. 5A-5H illustrate a first temperature indicating device using the present TSM compositions.
Figure 5:
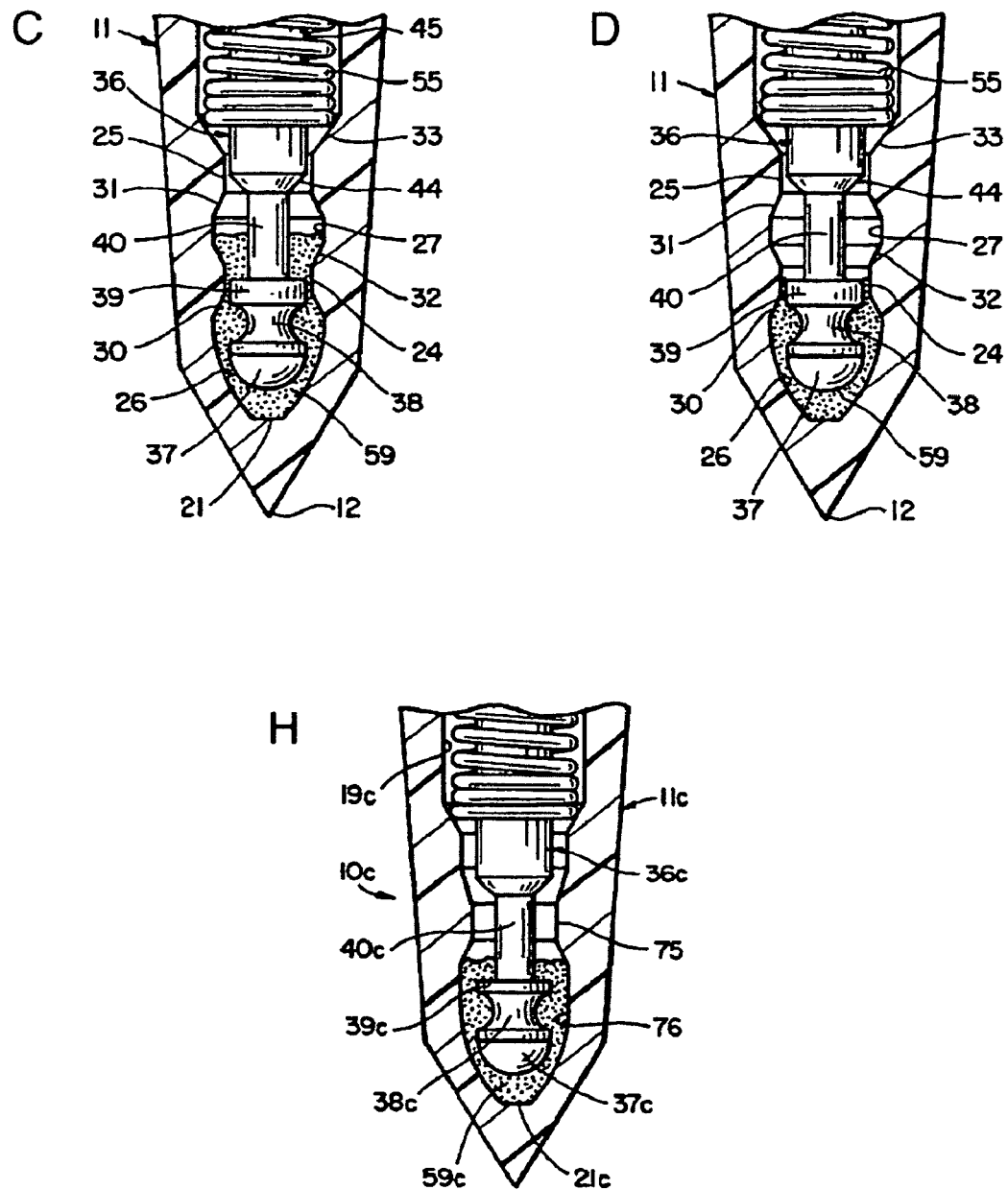
Figure 5:
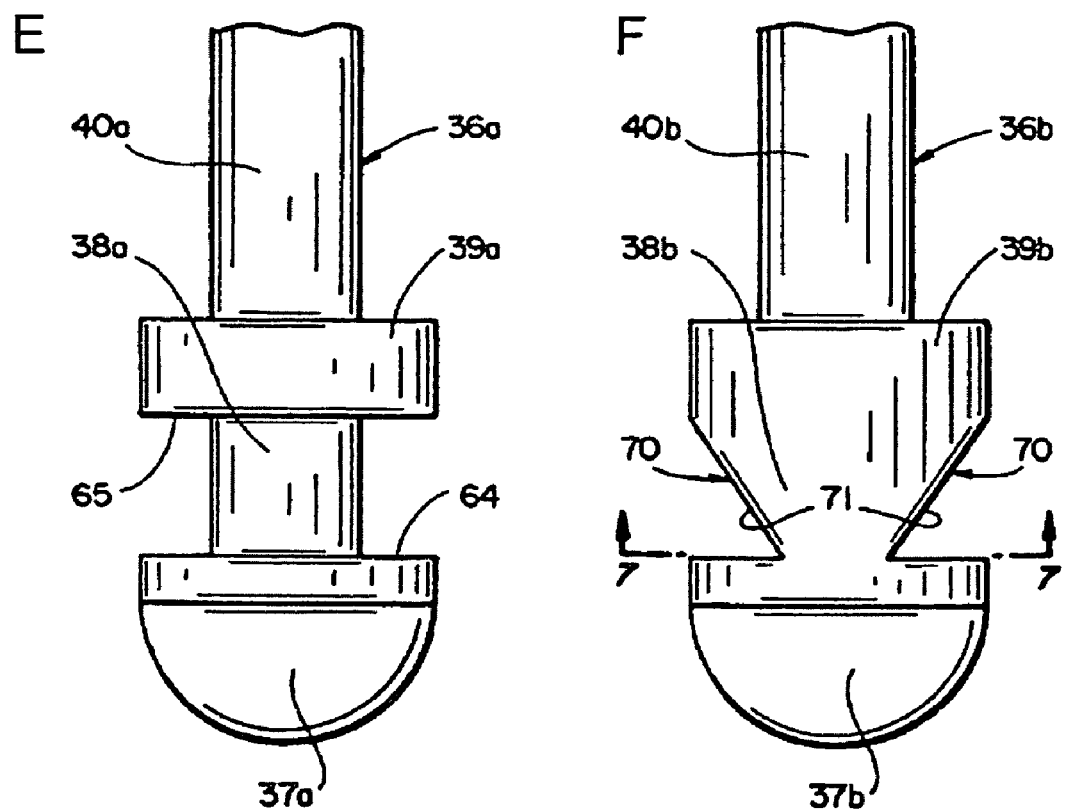

An exemplary temperature indicator/monitoring devices is described in U.S. Pat. No. 5,799,606 and illustrated in FIG. 5A-5H. Referring first to FIGS. 5A and 5B, such devices 10 generally include an elongate device/thermometer housing 11 having a pointed tip 12 and a transversely-extending flange 13 formed opposite the tip 12. The upper surface of the flange 13 is preferably substantially planar. A plurality of barbs 14 are formed on the exterior of the housing 11. The shape, size and number of exterior barbs 14 may vary as desired (two are exemplified). The device 10 may be inserted into poultry, meat, or other products by positioning the pointed tip 12 against the product and pressing the thermometer 10 inwardly until the underside of flange 13 engages the outer surface of the product. The barbs 14 securely hold the temperature indicating device 10 in place during storage, handling and cooking of the product.

The housing 11 is formed with a longitudinally-extending bore 19 having an open end 20 proximate the flange 13 and a closed end 21 near the pointed tip 12. The open end 20 may have a greater cross-sectional opening than the remainder of the bore to facilitate assembly of the temperature indicating device 10. The bore 19 tapers inwardly from the open end 20 to an annular restriction 22 which terminates in a downward outward slanted shoulder 23. The interior of the housing 11 includes a pair of spaced cylindrical neck regions 24 and 25 spaced inwardly from the restriction 22 and shoulder 23. The neck regions 24 and 25 define a first internal cavity 26 between the neck region 24 and the closed end 21 of the bore and a second internal cavity 27 between the two neck regions 24 and 25. The cylindrical portion of the first and second neck regions 24 and 25 have a lesser cross sectional opening than the internal cavities 26 and 27 and the remainder of the bore 19.

As shown particularly in FIGS. 5C and 5D, the housing 11 includes tapered shoulders 30, 31 extending outwardly from the lower edges of the cylindrical portion first and second neck regions 24, 25 to the internal cavities 26, 27. Tapered shoulders 32, 33 extend outwardly from the neck regions 24, 25 to the second internal cavity 27 and the interior wall of the bore 19, respectively. Although shoulders 30-33 are preferably tapered, the shoulders may also have an orientation perpendicular to the longitudinal axis of the bore.

With continued reference to FIGS. 5C and 5D, an indicator rod 36 is slidably positioned in the bore 19 of the housing 11. The indicator rod 36 generally includes an enlarged front end portion 37 and a first stem stretch 38 extending upwardly from the front end 37. A raised portion 39 separates the first stem stretch 38 from a second stem stretch 40. The first stem stretch 38 has a lesser cross sectional area than the adjacent portion of the front end 37, and the second stem stretch 40 has a lesser cross sectional area than the raised portion 39. The neck regions 24, 25 and the internal cavities 26, 27 of the housing 11 cooperate with the front end 37, raised portion 39, and stem stretches 38, 40 of the indicator rod, to retain the rod 36 in the housing.

The first stem stretch increases the surface area of the forward portion of the indicator rod 36. The exterior surface of the first stem stretch 38 has a concave shape with the stem stretch including a minimum diameter portion where the stem stretch has a minimum diameter and an upward-facing surface extending inwardly from the peripheral edge of the front end portion to the minimum diameter surface. The shape of stem stretch 38 may vary as desired. An advantage of the concave shape shown in the Figures is that it facilitates molding of the indicator stem; however, the shape of the first stem stretch may vary as desired. The concave exterior of the first stem stretch 38 may provide a recessed area which extends around the entire circumference of the rod 36. In other embodiments, the first stem stretch may have a cross sectional shape which defines one or more recessed areas which extend less than the entire circumference of the stem stretch 38. Although a stem stretch 38 having a lesser cross sectional area than the front end of the rod provides increased security, in other modifications of the invention the housing 11 may be used with an indicator stem in which the first stem stretch is of the same size as the front end 37 and raised portion 34 of the rod.

The front end 37 and the first stem stretch 38 may be positioned in the first internal cavity 26, the second stem stretch 40 is positioned in the second cavity 27, and the raised portion 39 is generally aligned with the first neck region 24. As shown particularly in FIG. 5C, the indicator rod 36 may be positioned in the bore with the front end 37 and the first stem stretch 38 being spaced inwardly in the bore from the first neck region 24, and the raised portion 39 is spaced inwardly from the second region 25. As used herein, the "first axial distance" is the axial distance between the surface of the first stem stretch 38 extending inwardly from the peripheral edge of the front end 37 and the first neck region 24, and the "second axial distance" is the axial distance between the surface of the stem stretch 40 extending inwardly from the peripheral edge of the raised portion 39 and the second neck region 25. The "first radial distance" is the radial distance between the first stem stretch 38 the wall of the first interior cavity 26, and the "second radial distance" is the radial distance between the second stem stretch 40 and the wall of the second interior cavity 27. As is shown in FIG. 5A, the first radial distance is less than the first axial distance and the second radial distance is less than the second axial distance such that when the fusible material filling the cavities 26, 27 is in solid form, the shoulder extending outwardly from the neck region 24 exerts a substantially downward direct force on the inward extending surface of the first stem stretch 38 and the shoulder extending outwardly from the neck region 25 exerts a substantially downward directed force on the inward extending surface of second stem stretch 40. However, if desired the housing 11 and indicator rod 36 may be configured to provide a different relationship between the neck regions 24, 25, internal cavities 26, 27 and the indicator rod 36.

A tapered shoulder 44 may extend outwardly from the second stem stretch 40 to an intermediate portion 45 of the indicator rod 36. The intermediate portion 45 may terminate in an outward extending collar portion 46 which has a greater cross sectional diameter than the intermediate portion 45. Extending upwardly from the collar portion 46 may be a rear end portion 47 having a lesser cross sectional diameter than the collar 46, or, if desired, the diameter of the end portion 47 may be equal to or greater than the diameter of the collar. The end portion 47 terminates in an enlarged cap portion 48 having a transversely extending underside 49. The underside 49 of the cap 48 is adapted to mate with the upper surface of the flange 13 on the housing 11. In the embodiment shown in FIGS. 5A-5D, the underside 49 of the cap is substantially planar. Instead of flange 13 and cap portion 48 having substantially planar surfaces, the upper surface of the flange 13 and the underside 49 of the cap may be formed with mating grooves and ridges or other complementary mating shapes if desired.

Referring in particular to FIGS. 5A and 5B, the device 10 includes means for urging the indicator rod 36 from the fully inserted position shown in FIG. 5A to an extended position with the cap 48 spaced from the flange 13 of the housing 11 shown for example in FIG. 5B. One such means is provided by a coiled spring 55 disposed around the intermediate portion 45 of the rod 36. The spring 55 is compressed between the slanted shoulder 33 of the housing 11 and the collar portion 46 of the indicator rod 36 when the indicator rod 36 is in the fully inserted position of FIG. 5A. Once the device 10 has reached a predetermined elevated temperature, the spring 55 is allowed to expand, moving the collar 46 away from the shoulder 33 and causing the indicator rod to be displaced outwardly through the open end 20 of the housing 11. The spring 55 is one example of a suitable means for urging the indicator rod 36 to an extended position. However, other means may be substituted for the spring 55.

A feature of the present devices is the use of a TSM composition 59 to partially or completely fill the first and second internal cavities 26, 27 around the indicator rod 36. As described herein, the TSM composition 59 is in the form of a solid under normal conditions and softens or melts at the desired temperature for the particular application. The TSM composition 59 engages front end portion 37, raised portion 39, and stem stretches 38, 40 to securely retain the indicator rod 36 in the housing 11. The stem stretches 38, 40 increases the surface area of the rod 36 engaged by the TSM composition 59, so that the rod may be more securely retained within the housing 11.

When the temperature indicating device is heated to a predetermined elevated temperature, the TSM composition 59 softens or melts, releasing the front end portion, raised portion and stem stretches of the indicator rod 36 from engagement with the solid TSM composition 59. The spring 55 is allowed to expand with the melting or softening of the TSM composition, moving the collar 46 against the slanted shoulder 23 and pulling the front end 37 of the rod from the softened TSM composition 59. The outward displacement of the indicator rod provides a visual indication the thermometer has reached the desired temperature.

As noted, the TSM composition 59 may substantially fill both internal cavities 26, 27. The indicator rod 36 is typically securely retained in the housing 11 until the TSM composition 59 is heated to a predetermined elevated temperature. The interengagement between the solid material 59, neck regions 24 and 25, internal cavities 26 and 27 and the front end 37, raised portion 38 and stem stretches of the rod resists any premature upward creep or movement of the rod 36 as the device is heated. The TSM composition must be substantially softened or melted before the indicator rod 36 may be moved relative to the housing 11. In some instances the device 10 may be provided with a reduced amount of TSM composition 59, for example, to reduce the cost of manufacturing.

Turning to FIG. 5C, the TSM composition 59 may fill the second internal cavity 27 to the level of the second stem stretch 40. Even though the TSM composition 59 does not completely fill both cavities, it engages a substantial portion of the indicator rod 36 to securely retain the rod in the housing 11. Specifically, the TSM composition 59 engages the front end 37, first stem stretch 38, raised portion 39, and a portion of the second stem stretch 40. The combination of the front end 37 and raised portion 39, and the reduced area stem stretches 38, 40, ensures that the TSM composition 59 securely anchors the indicator rod 36 within the housing. The minimal space separating the first neck region 24 and the raised portion 39 of the rod 36 provides additional protection against slippage of the indicator rod 36 and solidified TSM composition 59.

Turning to FIG. 5D, the device 10 may have a TSM composition 59 substantially filling the first internal cavity 26. This condition may occur for example when a fragment of a pellet of TSM composition, instead of an entire pellet, is inserted into the bore 19 during manufacture of the device 10. The TSM composition 59 engages the front end 37 and first stem stretch 38 to securely retain the indicator rod 36 in the housing 11. The engagement of the TSM composition with the stem stretch 38 of the indicator rod 36 and the first neck region of the housing 11 substantially resists any slippage or movement of the indicator rod 36 relative to the housing 11, until the temperature indicating device is heated to a predetermined elevated temperature. As shown in FIG. 5D, the TSM composition 59 may also extend around the raised portion 39. However, it is to be understood that the indicator rod 36 may be securely retained within the housing 11 if the first internal cavity includes only enough TSM composition to engage the front end 37 and first stem stretch 38 of the rod 36.

Another embodiment of a indicator rod 36a is shown in FIG. 5E. Indicator rod 36a includes a front end portion 37a, a first stem stretch 38a, a raised portion 39a, and a second stem stretch 40a. The exterior surface of the first stem stretch 38a is generally parallel to the longitudinal axis of the stem stretch 38a. The first stem stretch 38a has a cylindrical shape such that the exterior surface of the stem stretch 38a is substantially parallel to the longitudinal axis of the rod. First and second shoulders 64, 65 extend outwardly from the first stem stretch 38a to the peripheral edge of the front end 37a and the peripheral edge of the raised portion 39a in a direction perpendicular to the axis of the rod 36a. The first stem stretch 38a substantially increases the surface area of the forward end of the rod which is engaged by the TSM composition, so that the indicator rod 36a may be securely held within the housing 11.

FIGS. 5F and 5G show another modification of an indicator rod 36b having a front end 37b, a first stem stretch 38b, a raised portion 39b, and a second stem stretch 40b. The first stem stretch 38b is formed with two recessed areas 70. The recessed areas 70 are defined by a tapered surface 71 which slants inwardly from the outer edge of the raised portion 39b to a point spaced inwardly of the outer edge of the front portion 37b. The recessed areas 70 increase the surface area of the indicator rod 36b which may be engaged by the TSM composition so that the indicating rod may be securely held within the housing until the temperature indicating device has been heated to the predetermined elevated temperature. Although two recessed portions 70 are shown, it is to be understood that the number of recessed portions formed in the first stem stretch may be increased or decreased as desired. The size and shape of the recessed portion 70 is subject to considerable variation. Moreover, if desired the recessed area 70 may extend around the entire circumference of the first stem stretch as in the previously described modifications.

The device may 10 may also have a modified housing 11c as depicted in FIG. 5H. In this embodiment, the housing 11c includes an internal neck region 75 defining an internal cavity 76 between the closed end 21c of the bore 19c and the neck region 75. When the indicator rod 36c is fully inserted in the housing 11c, the front end portion 37c, raised portion 39c, and stem stretches 38c, 40c are disposed in the internal cavity 76. The TSM composition 59c preferably substantially fills the internal cavity 76. However, with some applications a lesser amount of TSM composition 59c may be used to retain the indicator rod in the housing 11c. The solidified TSM composition 59c engages the front end 37c, first stem stretch 38c, raised portion 39c, and second stem stretch 40c to hold the indicator rod 36c within the housing 11c of the device 10c. As used herein, the "axial distance" is the axial distance between the surface of the second stem stretch 40c extending inwardly from the peripheral edge of the raised portion 39c and the neck region 75, and the "radial distance" is the radial distance between the second stem stretch 40c and the wall of the second interior cavity 76. As is shown in FIG. 5H, the radial distance is less than the axial distance such that when the fusible material filling the cavity 76 is in solid form, the shoulder extending outwardly from the neck region 75 exerts a substantially downward direct force on the inward extending surface of the second stem stretch 40c. The increased surface area of stem stretches 38c and 40c ensures that the TSM composition securely anchors the rod 36c in the housing 11c until the temperature indicating device has been heated to the predetermined elevated temperature.

The above-described device 10 may be manufactured by separately forming the housing 11 and the indicator rod 36. The housing and rod are preferably formed by injection molding. A pellet of TSM composition 59 is positioned in the bore 19 and the housing is heated to melt the TSM composition. Alternatively, the TSM composition may be deposited in the housing in liquid form. The spring 55 is inserted into the bore 19. The indicator rod 36 is pressed into the housing 11 until the cap 48 engages the flange 13. The indicator rod 36 is held in place while the temperature indicating device cools, allowing the TSM composition to solidify. Once the TSM composition has solidified, the device 10 may be prepared for shipment.

Except as set forth above, the embodiments shown in FIGS. 5E-5H resemble those of FIGS. 5A-5D, and the same reference numerals followed by the subscripts a-c, respectively, are used to designate corresponding parts.

Example 3

Temperature Indicator/Monitoring Device

Another exemplary temperature monitoring device is described in U.S. Pat. No. 7,204,199 and illustrated in FIGS. 6A-6D. The device 10 includes barrel 12, which is a monolithic molded body made of a material capable of withstanding the elevated temperatures encountered in a cooking environment. Nylon is an exemplary material, although other materials could be adapted for use in the cooking environment as well. The barrel 12 includes lower barrel end 14 adapted for insertion into a food item, and which may be provided with one or more barbs 20 radially disposed near lower barrel end 14 for retaining the temperature monitoring device 10 in the food once inserted. Barrel 12 also includes annular flange 16 located adjacent upper barrel end 18. Flange 16 may be of varying radial dimensions so as to contact the surface of the food item when the device 10 is inserted therein to prevent further insertion.

Figure 6:
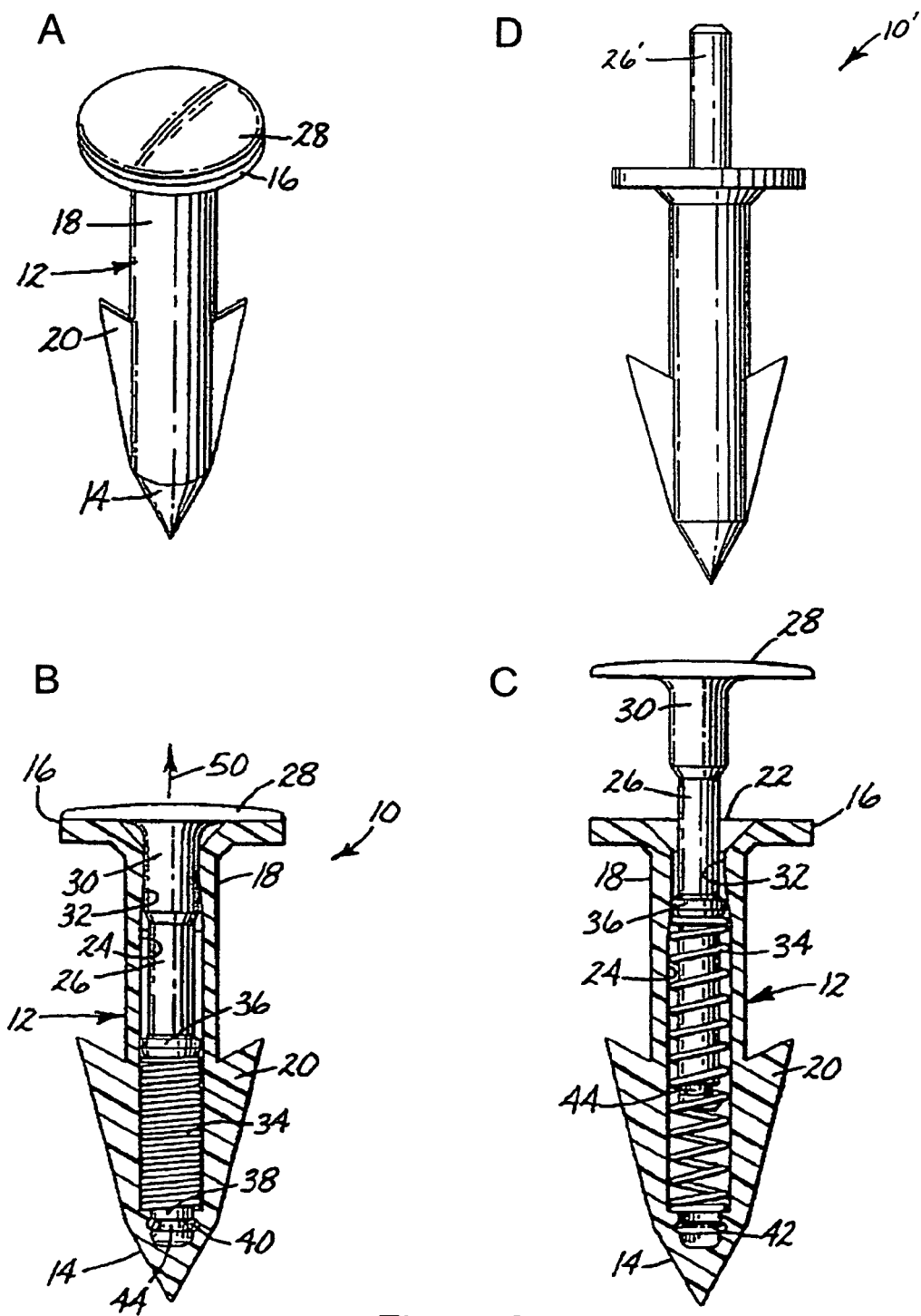
FIGS. 6A-6D illustrate a second temperature indicating device using the present TSM compositions.

Barrel 12 communicates with cavity 24 through orifice 22. Cavity 24 is adapted to contain at least part of indicator 26, such as a plunger, which is disposed through orifice 22 of barrel 12 and is maintained in slidable relation thereto within cavity 24. Indicator 26 is adapted to travel between a retracted position and an extended position. FIGS. 6A and 6B illustrate indicator 26 in a retracted position. However, the term "retracted position" does not suggest that the cap 28 is in intimate contact with flange 16. The exemplary indicator 26, when constructed without cap 28, may be in a retracted position with upper plunger end 30 either within cavity 24 or partially protruding therefrom. FIGS. 6C and 6D illustrate indicator 26 in an extended position. Indicator 26 provides a visual indication of the attainment of a predetermined temperature when indicator 26 is in an extended position.

Means can be provided to resiliently bias indicator 26 toward the extended position. In the illustrated embodiment, the biasing means comprises spring 34. In FIG. 6B, spring 34 is circumferentially disposed about indicator 26 and exerts a force in direction 50 against annular plunger flange 36 located on indicator 26. The opposite end of spring 34 contacts and exerts a force against annular seat 38, formed in cavity 24. Other biasing means include hinges, bent rods, accordions, springs, and the like that take advantage of certain materials natural tendency to return to a preformed position. In one illustrative embodiment, a molded device incorporates the barrel and a biasing device in a single formed unit, thus eliminating the need for separate metal springs 34. In another embodiment, the device comprises a thermopolymeric material in the form of a coil. When the coil heats up, it uncoils, turning a needle, hand or other indicator means to show the progress of the cooking. For example, a needle indicator means could turn, like a clock or thermometer, to point to a "done" indication. In another example, the coil could turn a colored dial such that in the uncooked state, the dial would show a first color and in the cooked state, the dial would have rotated to show a second color.

In the embodiment shown in FIGS. 6A-6D, retaining means are provided to maintain indicator 26 in a retracted position prior to use against the force of spring 34 or other biasing means. The retaining means includes a TSM composition 40 positioned within cavity 24 to mechanically interfere with indicator 26. In the illustrated embodiment, TSM composition 40 is positioned within annular retainer cavity 42, which is aligned with annular plunger depression 44. Both retainer cavity 42 and plunger depression 44 are illustrated as annular semi-hemispherical depressions, although any configuration which permits mechanical interference between the TSM composition 40 and retainer cavity 42, and/or between TSM composition 40 and plunger depression 44, is contemplated. Furthermore, TSM composition 40, plunger depression 44, and retainer cavity 42 could be located at any point along indicator 26 so as to retain indicator 26, but are preferably located adjacent lower barrel end 14. Indicator 26 is maintained in a retracted position by the TSM composition 40 until, after exposure to an elevated temperature at or near the preselected temperature, the TSM composition 40 yields, allowing spring 34 to move indicator 26 in direction 50. FIG. 6C shows indicator 26 in the extended position, which corresponds to the ambient temperature being above the yield temperature of the TSM composition 40.

Cap 28 can be affixed atop indicator 26 and is adapted to maintain intimate contact with flange 16. When indicator 26 is in a retracted position, cap 28 prevents contaminants from entering cavity 24, and prevents the TSM composition 40 from leaking out of cavity 24 of temperature monitoring device 10. Cap 28 also provides increased visibility when indicator 26 is in the extended position. Upper plunger end 30 can be adapted to maintain sliding sealing contact with cavity wall 32 to further aid in preventing contaminants from entering, or retaining material from leaving cavity 24. FIG. 6D illustrates an alternative embodiment of the device 10' in which the cap 28 has been omitted, thereby presenting indicator 26' for visual identification upon the attainment of the specified temperature.

Example 4

Fire Sprinkler

Fire sprinklers are well-known in the art. Fire sprinklers typically comprise an amount of temperature sensitive material, such as a eutectic alloy, which in solid applies pressure to a seal, preventing water from flowing from the sprinkler. The temperature-sensitive material softens or liquifies at a preselected elevated temperature, releasing pressure on the seal and allowing water to flow.

TSM compositions have more than adequate strength narrowness of melting point to substitute for conventional temperature sensitive materials used in fire sprinklers. Moreover, unlike widely-used eutectic alloys, TSM compositions are inexpensive and relatively non-toxic. As described, herein, TSM compositions can be tailored to a particular application by selecting a LMWOC and strengthening agent that produce a TSM composition that melts at a desired temperature. The U.S. National Fire Protection Association (NFPA) maintains information and standards for fire sprinklers.

Figure 7:
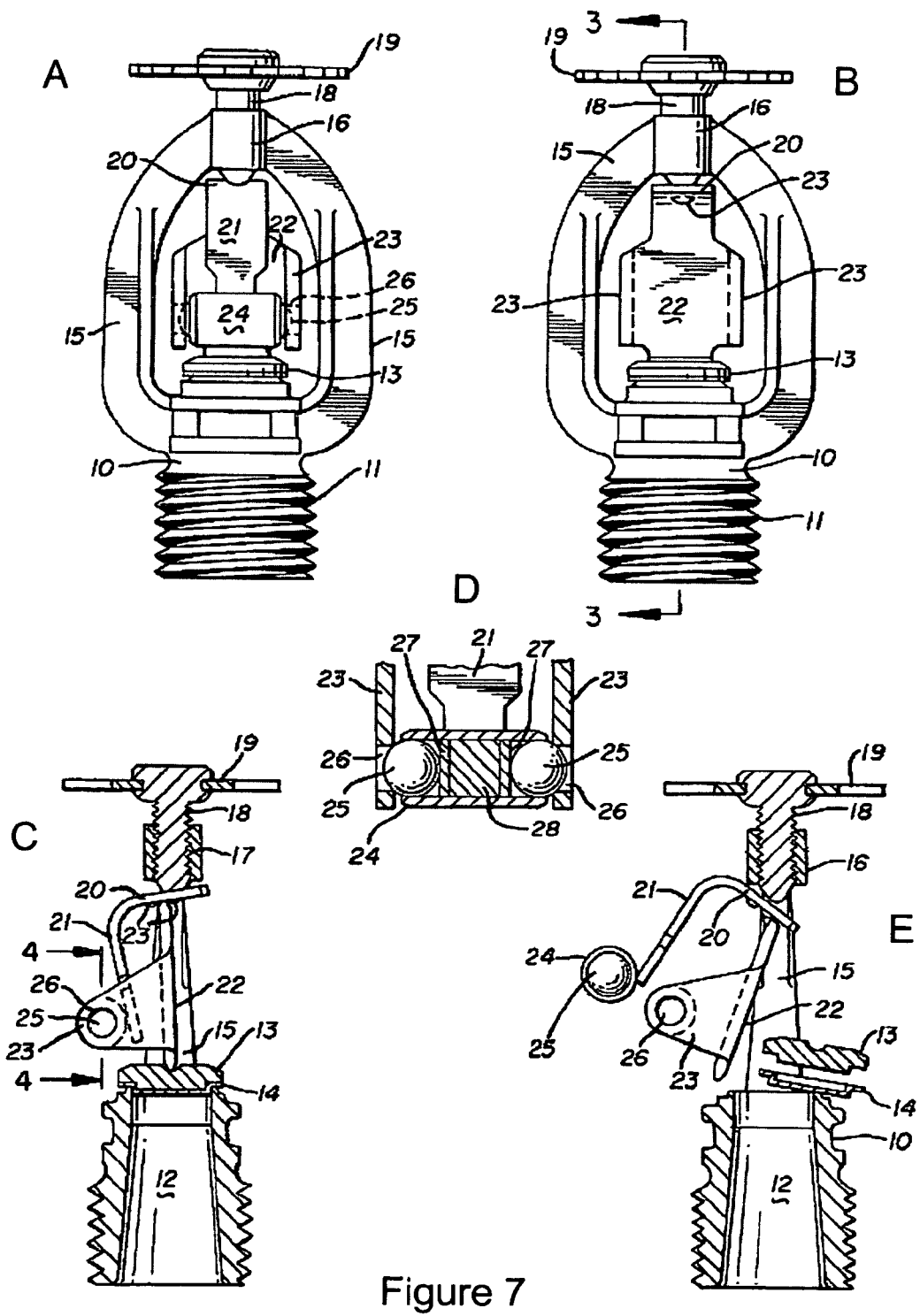
FIGS. 7A-7E illustrate a fire sprinkler device using the present TSM compositions.

Exemplary fire sprinkler devices are illustrated in FIGS. 7A-7E. The sprinkler comprises an apertured body member 10, the lower portion of which may be threaded as at 11 so that it can be turned into a pipe fitting in a sprinkler system. The apertured body member 10 defines a fluid delivery passage 12 as seen in FIGS. 7C and 7E, and the discharge end thereof is normally closed by a closure cap 13 and gasket 14. A frame formed of oppositely disposed spaced arms 15 is integrally formed with the body member 10 and the outer end of the arms 15 are joined as at 16 to form a passageway 17 in which a stakable compression screw 18 is positioned. A deflector 19 is secured to the outer end of the compression screw 18. The compression screw 18 extends inwardly of the junction 16 of the arms 15 and it lies on the axial center line of the fluid delivery passageway 12 of the sprinkler. The inner end of the screw 18 is pointed for registry with a depression in a substantially horizontal portion 20 of an inverted generally L-shaped lever 21. A straight substantially vertically positioned strut 22 is positioned with one of its ends in a depression in the closure cap 13 and its opposite end against the inner surface of the substantially horizontal portion 20 of the lever 21 and between a pair of spaced projections thereon. The strut 22 is positioned substantially on the axial center line of said fluid delivery passageway 12. The strut 22 has a pair of oppositely disposed sidewardly extending apertured arms 23 formed integrally therewith and inwardly of its upper and lower ends and the substantially vertical portion of the lever 21 extends into the area between the arms 23.

Referring to FIGS. 7A and 7D, it will be seen that a tubular body 24 is positioned between the apertured arms 23 so that a pair of spheres 25 positioned partially within the ends of the tubular body 24 are also partially engaged in oppositely disposed apertures 26 in the outer portions of the arms 23. A pair of discs 27 are located one on either side of a pellet of TSM material 28 with the discs 27 engaging the innermost surfaces of the spheres 25. The outermost ends of the tubular body 24 are crimped slightly so as to cage the spheres 25 therein which is useful during assembly of the sprinkler as disclosed herein. The outer surfaces of the opposite ends of the tubular body 24 are tapered slightly.

FIG. 7E illustrates the sprinkler of FIG. 7C in an open or activated position after the TSM composition softens or melts at the predetermined temperature. The fluid pressure normally present in the fluid delivery passageway 12 has been released by the softening/melting of the TSM composition 28, which permits the discs 27 and the spheres 25 to move inwardly of the tubular body 24 so that level 21 can move outwardly of the openings 26 in the apertured arms 23 of the strut 22, which are responsive to the pressure urging such action as occasioned by the tension on the substantially horizontal portion 20 of the lever 21 and assisted by the pressure of the fluid in the fluid delivery passageway 12. The gasket 14, cap 13, strut 22, and lever 21 all move away from the sprinkler and permit the fluid discharged through the fluid passageway 12 to strike the deflector 19 and be directed in a desired pattern.

It will be recognized that numerous sprinkler mechanisms have been designed to take advantage of the present TSM compositions. Examples of fire sprinklers that include temperature sensitive materials are described in, e.g., U.S. Pat. Nos. 4,346,554, 4,796,420, 4,893,679, 5,120,152, and 5,686,878, all which are incorporated by reference.

The foregoing examples of the related art and limitations related therewith are intended to be illustrative and not exclusive. Other limitations of the related art will become apparent to those of skill in the art upon a reading of the specification and a study of the drawings.

It is claimed:

1. A thermoresponsive switching material (TSM) composition comprising:
   (a) a low molecular weight organic compound (LMWOC) that is a crystalline non-polymeric material having a melting point of about 50-120° C., and
   (b) a strengthening agent having a molecular weight of from about 500 to about 5,000 Da as a minor component, wherein the composition has increased mechanical strength compared to the low molecular weight organic compound-based material and substantially the same melting point and melting point spread as the low molecular weight organic compound.

2. The composition of claim 1, wherein the strengthening agent has a softening point or melting point at least about 10° C. above the melting temperature of the low molecular weight organic compound.

3. The composition of claim 1, wherein the strengthening agent has a softening point or melting point at least about 15° C. above the melting temperature of the low molecular weight organic compound-based material.

4. The composition of claim 1, wherein the strengthening agent is present in an amount of 10% or less.

5. The composition of claim 1, having a mechanical strength below its melting temperature that is at least 10% greater than the mechanical strength of the low molecular weight organic compound-based material.

6. The composition of claim 1, having a melting point spread of 10° C. or less.

7. The composition of claim 1, having a melting point spread of 7° C. or less.

8. The composition of claim 1, wherein the organic compound is selected from the group consisting of n-alkyl carboxylic acids, n-alkyl benzamides, bis n-alkyl amides, and n-alkyl alcohols.

9. The composition of claim 1, wherein the strengthening agent is a tackifier.

10. The composition of claim 1, wherein the strengthening agent is amorphous.

11. The composition of claim 1, wherein the strengthening agent has a total crystallinity of less than 10 joules/gram.

12. The composition of claim 1, wherein the strengthening agent has a heat of fusion of less than about 10 J/g.

13. The composition of claim 1, wherein the strengthening agent is present in an amount of 20% or less.

14. The composition of claim 1, wherein the strengthening agent is selected from the group consisting of a rosin, a polymerized rosin, a rosin ester, an ethylene/acrylic acid copolymer, a non-polar hydrocarbon, a monoamide, a polyethylene wax, an aliphatic or cycloaliphatic resin, and a pentaerythritol ester.

15. The composition of claim 14, wherein the strengthening agent is crystalline.

16. A temperature sensor comprising a composition of claim 1.

17. The temperature sensor of claim 16, wherein the sensor is disposable following a single use.

18. The temperature sensor of claim 16, wherein the sensor is reusable.

19. A device comprising a composition according to claim 1.

20. The device according to claim 19, wherein the device is a thermoresponsive device.

21. The device according to claim 19, wherein the device is a thermo-mechanical actuator comprised of a fixed member comprised of a composition according to any one of claims 1 to 3 and 4-12, and at least one moveable member coupled to the fixed member, wherein the moveable member is induced to move when the fixed member is exposed to a temperature change.

22. A device according to claim 19 wherein the device is a thermo-mechanical device having at least one lumen and said material forms a temporary plug in lumen which plug is displaced when heated to a temperature.

* * * * *